United States Patent
Miserendino et al.

(10) Patent No.: US 12,463,992 B2
(45) Date of Patent: Nov. 4, 2025

(54) DATA COLLECTION MANAGEMENT

(71) Applicant: Comcast Cable Communications, LLC, Philadelphia, PA (US)

(72) Inventors: Scott Miserendino, Arlington, VA (US); Ryan Peters, Reston, VA (US); Jeffrey Oatess, Edgewater, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 344 days.

(21) Appl. No.: 17/864,480

(22) Filed: Jul. 14, 2022

(65) Prior Publication Data
US 2024/0022583 A1    Jan. 18, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC .......... H04L 63/1425; H04L 63/1416
See application file for complete search history.

(56) References Cited

U.S. PATENT DOCUMENTS

| | | | |
|---|---|---|---|
| 11,258,825 B1* | 2/2022 | Yang | H04L 63/20 |
| 2017/0099306 A1* | 4/2017 | Chiu | H04L 63/1441 |
| 2020/0409339 A1* | 12/2020 | Arashanipalai | G06F 16/906 |

FOREIGN PATENT DOCUMENTS

KR    20090055943 A  *  6/2009  ........ H04W 52/0225

OTHER PUBLICATIONS

"Utilize SOAR to accelerate threat investigation and response", Security Orchestration Automation and Response (SOAR) | ManageEngine | Log360, dated May 17, 2022, 10:16AM. © 2022 Zoho Corp., pp. 1-9, https://www.manageengine.com/log-management/security-orchestration-automation-and-response-soar.html?source=security-orchestration-automation-and-response-soar.

* cited by examiner

*Primary Examiner* — Matthew T Henning
(74) *Attorney, Agent, or Firm* — Banner & Witcoff, Ltd.

(57) ABSTRACT

Systems, apparatuses, and methods for providing security in a network that may be managed by the collection of data from sensors. A computing device may instruct sensors on one or more networks to collect and report data of certain data types based on modes that indicate instructions for sending and/or storing data of one or more data types. If the reported data is determined to indicate a security event, the computing device may determine additional data and/or data types useful in monitoring the security event, identify sensors based on a proximity of the sensors to the security event, and update the sensor modes based on new data collected.

28 Claims, 9 Drawing Sheets

| Endpoint sensor reporting modes | | | Data to be reported by endpoint sensors (cumulative) | |
|---|---|---|---|---|
| Endpoint sensors | | | No Security Event | |
| 351b | 351a | 341b 341a | Data Level | First network state | Second network state |
| ▓▓ | ▓▓ | ▓▓ ▓▓ | 1 (low) | logins, process creates, network flows | logins |
| ▓▓ | ▓▓ | ▓▓ ▓▓ | 2 (default) | module loads, tokens, task creates | process creates, network flows, module loads |
| | | | 3 (slightly elevated) | file writes, registry writes | tokens, task creates |
| | | | 4 (elevated) | flow IO, process terminations, tasks, http sessions | flow IO, process terminations, tasks |
| | | | 5 (high) | file reads, registry reads, threads, connections | file writes, registry writes, file reads, registry reads, threads, connections |

FIG. 3B

| Endpoint sensor reporting modes | | | | Data to be reported by endpoint sensors (cumulative) | | |
|---|---|---|---|---|---|---|
| Endpoint sensors | | | | | Security event at time t | |
| 351b | 351a | 341b | 341a | Data Level | First network state | Second network state |
| ▓ | ▓ | ▓ | ▓ | 1 (low) | logins, process creates, network flows | logins, process creates (t±Δt), network flows (t±Δt) |
| ▓ | ▓ | ▓ | ▓ | 2 (default) | module loads, tokens, task creates | other process creates, other network flows, module loads, task creates (t±Δt) |
| ▓ | ▓ | ▓ | ▓ | 3 (slightly elevated) | file writes, registry writes, process terminations (t±Δt), tasks (t±Δt), connections (t±Δt) | tokens, other task creates, process terminations (t±Δt), tasks (t±Δt), connections (t±Δt) |
| ▓ | ▓ | ▓ | | 4 (elevated) | flow IO, other process terminations, other tasks, file reads (t±Δt), registry reads (t±Δt) | flow IO, other process terminations, other tasks |
| | ▓ | ▓ | | 5 (high) | other file reads, other registry reads, threads, other connections | file writes, registry writes, file reads, registry reads, threads, other connections |

FIG. 4B

DATA COLLECTION MANAGEMENT

BACKGROUND

As more and more computing devices become connected to data networks, the vulnerability to hackers and computer viruses increases, and while it may be possible to monitor those computing devices, the volume of cyber data makes identifying data that may be evidence of malicious or damaging activity difficult. Improper or unauthorized data access may not be noticed until it is too late and damage has occurred

SUMMARY

The following summary presents a simplified summary of certain features. The summary is not an extensive overview and is not intended to identify key or critical elements.

Systems, apparatuses, and methods are described for data collection management. A computing device may monitor various conditions, such as network congestion or suspicious network behavior, and instruct sensors on one or more networks to report greater or fewer types and quantities of sensor data. The sensors may be configured to store and report data according to different modes which may correspond to different levels of reporting (e.g., higher levels may entail handling more types of data, sending data more frequently, etc.), and the instruction from the computing device may be an instruction to set (e.g., handle data according to), or change, a mode. Analytics systems may assess the data to determine whether a security event was detected. If a subset of the data is determined to indicate a security event, the computing device may use the subset and predefined rules for a security event type of the security event to identify a subset of sensors for which to change modes and/or from which to request additional data useful in monitoring the security event. The computing device may send, to the subset of sensors, instructions to change a mode and/or collect, store and/or report the additional data. The instructions may comprise a time frame for applying the mode change. The computing device may identify sensors for which to change modes based on a temporal, physical and/or network proximity to the security event and update sensor levels iteratively as new data is collected. The computing device may analyze received data to determine whether to increase a sensor's level of awareness (e.g., the sensor's level of data collection and reporting) or decrease the sensor's level of awareness.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3B shows an example of information that may be stored and managed by the computing device.

FIG. 4B shows an example of the information of FIG. 3B adjusted following the detection of the security event as in FIG. 4A.

DETAILED DESCRIPTION

Figure 1:
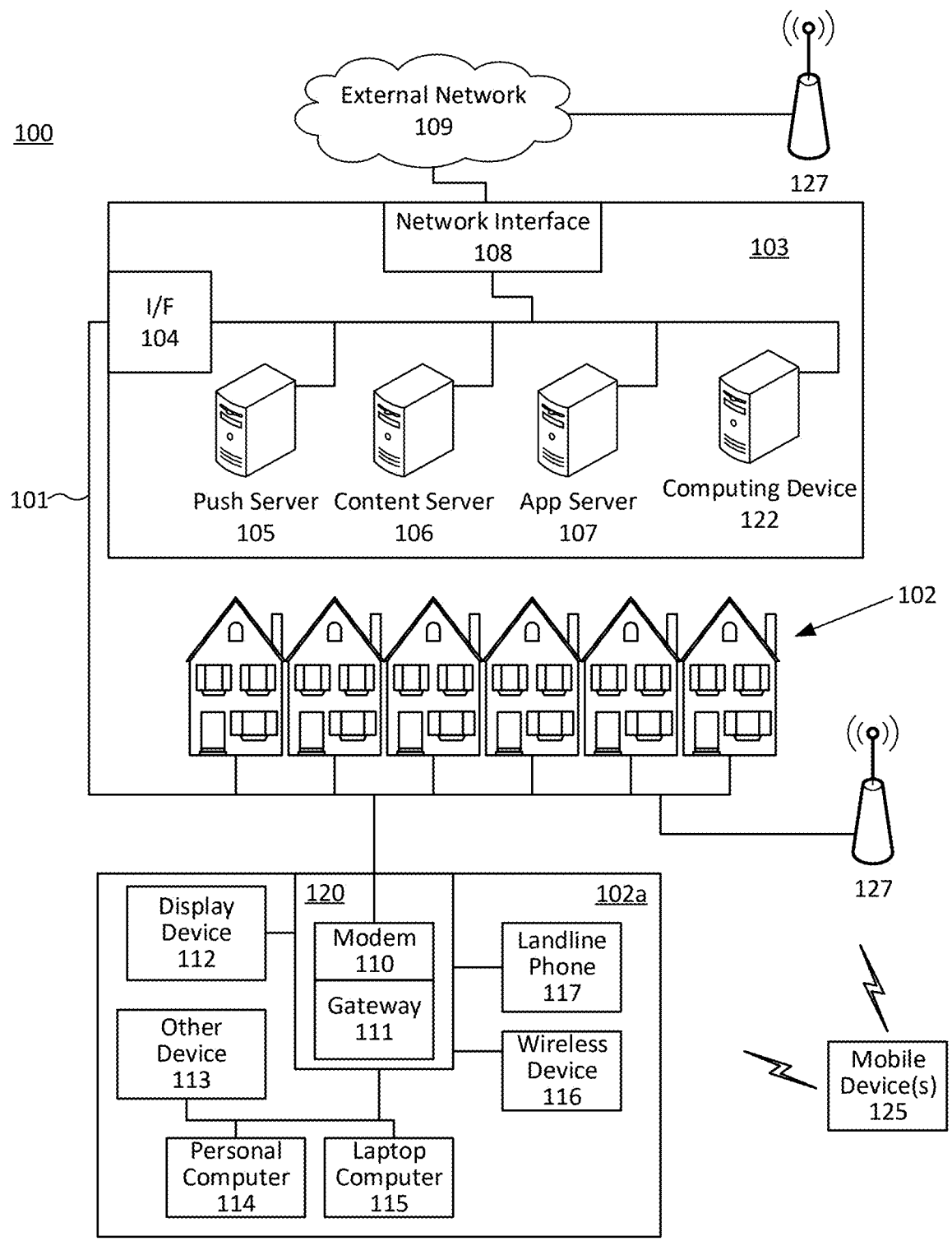
FIG. 1 shows an example communication network in which features described herein may be implemented.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s).

The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being sent to devices in the premises 102 and/or to the mobile devices 125. The local office 103 may comprise additional servers, such as the computing device 122 (described below), additional push, content, and/or application servers, and/or other types of servers. Although shown separately, the push server 105, the content server 106, the application server 107, the computing device 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

The local office 103 may comprise a computing device 122, which may be implemented as a software process executing on a computing device. Although shown separately, the computing device 122 may be combined with one or more of the push server 105, the content server 106, and the application server 107. The computing device 122—may be placed outside of the local office 103 and may communicate with any network devices (e.g., a device on the external network 109, any of servers 105-107, modem 110, gateway 111, or any of the wireless access points 127), or endpoint devices (e.g., display device 112, personal computer 114, laptop computer 115, wireless device 116, other device 113, mobile device 125, or any other user facing device) through communication network, or other types of communication network.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
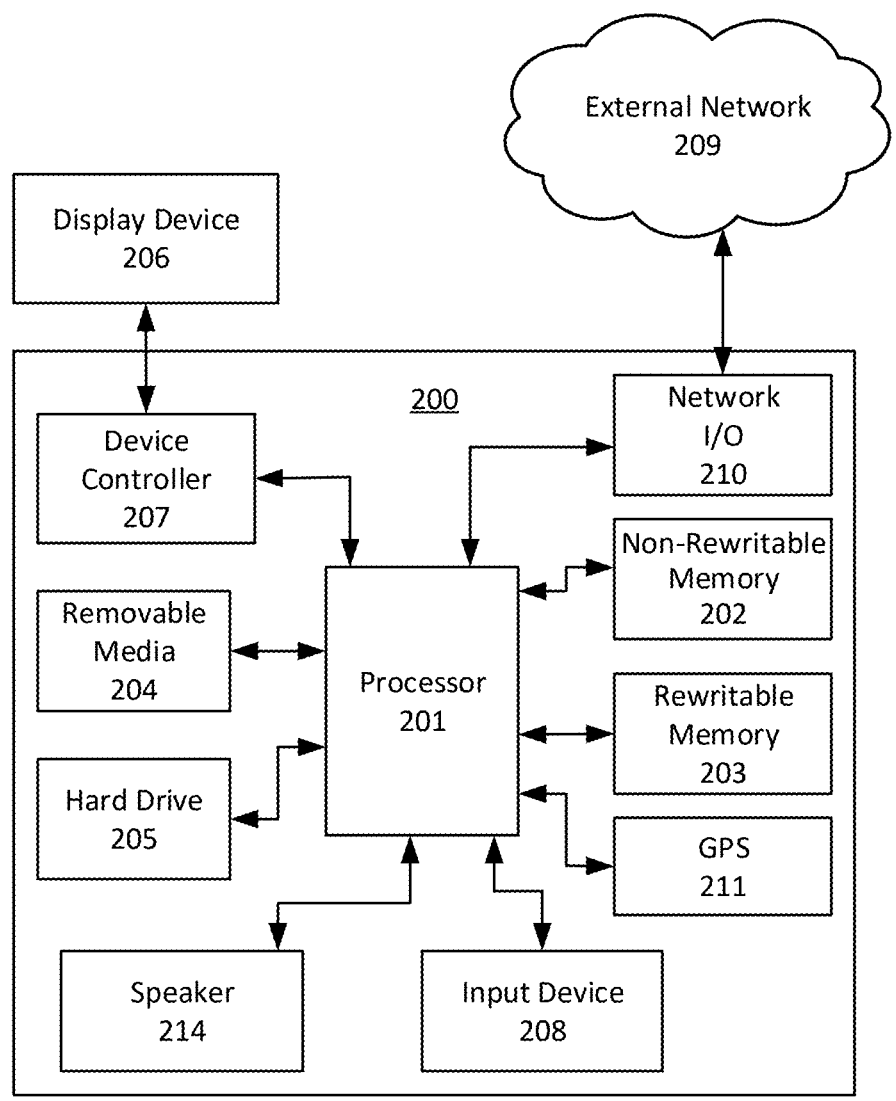
FIG. 2 shows hardware elements of an example computing device that may be used to implement any of the various devices described herein.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., endpoint devices, network devices, network monitors, computing device 122s, event analyzers). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
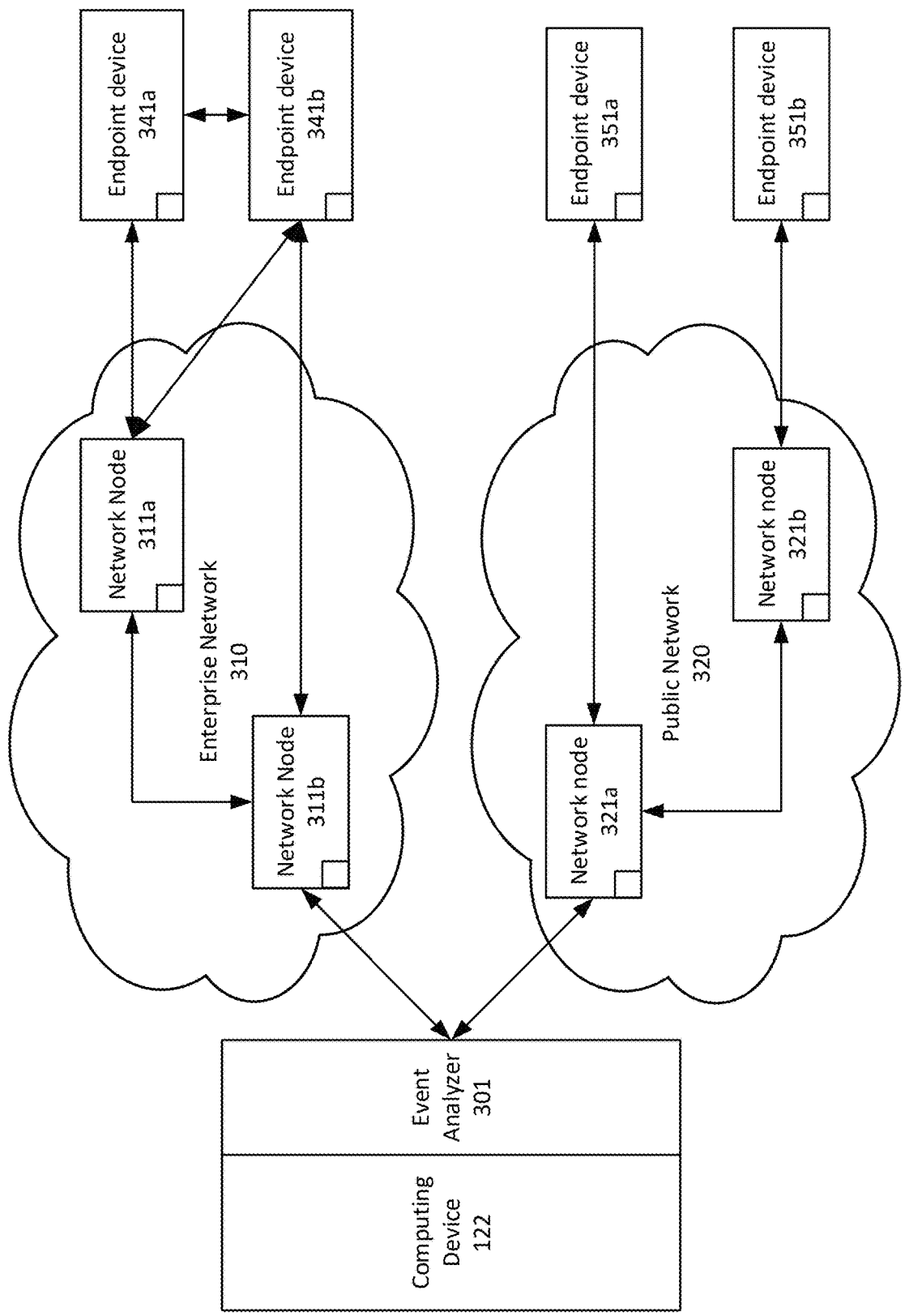
FIG. 3A shows an example of a system for data collection management.

FIG. 3A shows an example system for data collection management. An computing device 122 (e.g., an orchestrator) may generate, manage and store data collection management rules and reporting modes for sensors that collect data flowing through or generated on devices on one or more networks. The computing device 122 may communicate with, and collect data from, network sensors associated with network devices (e.g., network nodes 311a-b and 321a-b) and endpoint sensors associated with endpoint devices (e.g., endpoint devices 341a-b and 351a-b). The communication may be through a communication link 101 and/or through one or more networks, such as an enterprise network 310 or public network 320. The computing device 122 may receive the data via, and/or process the data with, an event analyzer 301. The event analyzer 301 may be a separate device in communication with the computing device 122, or it may be part of the computing device 122. The sensors (such as network sensors associated with network nodes 311a-b and 321a-b and endpoint sensors associated with endpoint devices 341a-b and 351a-b; the sensors are depicted in FIG. 3A as boxes in the network nodes 311a-b/321a-b and endpoint devices 341a-b and 351a-b) may be configured to continuously and/or periodically and/or conditionally send raw data to storage and analytic systems (e.g., event analyzer 301) of, or associated with, the computing device 122. The computing device 122 may receive and send data to the sensors through a bus, which may provide messaging infrastructure between the sensors and the computing device 122 and may comprise one or more of: a memory bus, a system bus, an address bus, a message bus, a power bus, or one or more reference links or interface(s). The computing device 122 may be physically and/or logically distinct from the sensors and/or devices, particularly in the case that the computing device 122 is implemented as a virtual machine.

Network nodes 311a-b and 321a-b and endpoint devices 341a-b and 351a-b may be monitored by one or more sensors capable of monitoring (e.g., collecting or causing collection of data flowing through or indicating processes that occur on) the devices. One or more sensors may be configured to monitor a single device, or a single sensor may be configured to monitor multiple devices. Any of network nodes 311a-b and 321a-b and endpoint devices 341a-b and 351a-b may comprise a sensor for monitoring that device and/or other devices. Sensors described herein may be a computing device, or a part thereof, and may comprise hardware, software or a combination of hardware and software. The computing device 122 may generate or maintain a list of devices with associated sensors, and/or may generate or maintain a list of the sensors associated with the devices. The computing device 122 may maintain separate lists for endpoint sensors and endpoint devices. Endpoint sensors may detect data flowing through, or indicating processes occurring on, an endpoint device. An endpoint device may be a device that can serve as a terminal of a data communication network (e.g., a device through which data may enter or leave the network). Endpoint devices 341a-b and 351a-b of FIG. 3A may be, for example, any of devices 112-116 and 125 in FIG. 1. Endpoint sensors may be, for example, a browser plug-in, an antivirus program operating on a user device such as a smartphone, laptop, desktop; an operating system logging program, application or plug-in. A network sensor may detect data flowing through or indicating processes occurring on a network device, and/or may be configured to observe data traffic or data flow between devices in one or more networks. For example, a network sensor may be one or more of virtual private networks (VPNs), intrusion detection systems, IP traffic flow collectors, transmission control protocol (TCP) collectors, router system logs, firewall logging programs, internet service provider logs, a network monitor or signature-based sniffer. A network device may be a device that distributes data throughout a network, (e.g., modems, hubs, switches, bridges, wireless access points, etc.) or a dedicated system for processing network traffic. Network nodes 311a-b and 321a-b may be, for example, any of modem 110, gateway 111, wireless access points 127, or network devices on external network 109, etc.

Endpoint sensors for endpoint devices 341a-b and 351a-b and network sensors for network nodes 311a-b and 321a-b may perform passive telemetry on data passing through or generated on for endpoint devices 341a-b and 351a-b or network nodes 311a-b and 321a-b. The endpoint sensors and network sensors may send data to the computing device 122 without performing analytical processing and/or threat detection. Also, or alternatively, the endpoint sensors and network sensors may have internal analytical capabilities to identify suspicious events or potential security events according to stored security event type definitions and rules. Endpoint sensors and/or network sensors may detect data or observe data traffic in real-time real-time and may be in direct or indirect communication with the computing device 122. Also, or alternatively, endpoint sensors and/or network sensors may detect or observe data traffic periodically or conditionally (based on certain conditions being satisfied or according to instructions from the computing device 122).

For each sensor in communication with the computing device 122, the computing device 122 may request that data be collected and stored locally (e.g., cached at the sensor and/or an associated device) and/or sent to the computing device 122 according to rules provided to the sensor by the computing device 122. Data collected and stored locally at a sensor and/or associated device may be stored locally for a set amount of time and may be discarded. The set amount of time may be based on instructions from the computing device 122. Data sent to the computing device 122 by the sensor may be sent in real-time (e.g., as detected and/or collected by the sensor), periodically (e.g., once an hour, once a minute, once a second, once a millisecond, etc.), and/or conditionally (e.g., based on a certain amount of the data having been collected, based on data received by the computing device 122 indicating a security event, based on a request, from the computing device 122, for the data, based on detection of data of another data type).

The computing device 122 may control data collection and storage and/or reporting by a sensor and/or device based in part on a mode associated with the sensor and/or device. The mode may indicate instructions for storing data (e.g., to store particular amounts of data, of particular data types and/or from particular data fields and/or to store data over particular time frames locally at a sensor and/or a device associated with the sensor) and/or for sending data (e.g., to send particular amounts and frequencies of data of different data types, by the sensor to the computing device 122, where the data comprises or indicates information flowing through, or processing occurring on, a device associated with the sensor). The mode may be one of a plurality of modes that correspond to one or more levels of storage and/or reporting. The modes may be indicated by numerical level values, such as 1, 2, 3, 4 and 5 on a scale from 1-5, or any other numerical value within a scale. Higher levels may be associated with higher awareness of the sensors (e.g., more data types collected, more data fields detected, greater amounts of data stored, longer local data storage times, more data reported to the computing device 122, more frequent data reporting to the computing device 122). Lower levels may be associated with modes achieving a lower awareness of the sensors (e.g., fewer data types collected, less local data stored, less data reported to the computing device 122, less frequent data reported to the computing device 122). A sensor at a mode corresponding to a high level may collect and report (e.g., send to the computing device 122) more data types, more frequently and/or in higher quantities than the same sensor at a low level. The terms "high level" and "low level" used herein, and numbers 1-5 labeling the levels, are merely used for convenience to differentiate between the levels of data reporting. These labels may be used differently if desired (e.g., "higher" level numbers may correspond to lower amounts of data reporting, lower reporting frequency, etc.). Alternatively, modes may be indicated by qualitative labels (e.g., low, medium, high) or arbitrary labels (e.g., red, yellow, green). The modes may correspond to predefined instructions for reporting data of different data types at prescribed amounts and/or rates. The different modes may each correspond to different predefined instructions to achieve different levels of awareness of the sensors (e.g., different data types collected, different data fields detected, different amounts of data stored, different local data storage times, different data reported to the computing device 122, different frequencies of data reporting to the computing device 122, etc.). For ease of discussion, modes will be discussed using the example in which a mode corresponding to a high level value (e.g., 5 on a scale from 1-5) is associated with a high level of awareness and a mode corresponding to a low level value (e.g., 1 on a scale from 1-5) is associated with a low level of awareness. Data collection and reporting according to different modes may overlap and/or be cumulative. For example, in a case of cumulative modes, a high level mode (e.g., mode 5 on a scale from 1-5) may indicate instructions to collect and report data of data types that are also to be collected and reported according to instructions indicated each of the lower level modes (e.g., data types assigned to each of modes 1-4 may be included in the mode 5 reporting), and may indicate additional instructions to collect and report data of one or more additional data types (e.g., data types assigned only to mode 5).

FIG. 3B shows a table with examples of information that may be stored at the computing device 122 and used to direct data collection and reporting by endpoint devices 341a-b and 351a-b of FIG. 3A. The left portion of the table of FIG. 3B, under the heading "Endpoint sensor modes", indicates that endpoint devices 341a-b and 351a-b are each set to mode 2 (represented by the shaded cells under each endpoint device label), on a scale from 1-5, for reporting data (e.g., sending data to the event analyzer 301 and/or the orchestrator 122). Based on receiving information indicating mode 2, sensors of endpoint devices 341a-b and 351a-b (e.g., sensors running on endpoint devices 341a-b and 351a-b and shown as squares in FIG. 3A) may access instructions (e.g., retrieve stored instructions or instructions received with the information indicating the mode) corresponding to modes 1-5. The sensors may determine, using the information indicating mode 2 and from the accessed instructions, instructions indicated by mode 2. The instructions indicated by mode 2 may be configured to cause the sensors to send (and/or store) data of data types assigned to level 2. In a case of cumulative level modes, the sensor may determine, from the accessed instructions, instructions that are configured to cause the sensors to send (and/or store) data of data types associated with level 2 and all lower levels (e.g., data types associated with levels 1-2). Other modes may correspond to any other level or set of levels (e.g., levels 1 and 4, levels 2-3 and 5, etc.) Based on the mode corresponding to level 2, the sensors of the endpoint devices 341a-b and 351a-b may determine instructions causing them to send (and/or store) data of data types assigned to level 2 at one or more first rates, one or more first sampling rates or one or more first amounts. The one or more first rates may be reporting data of a data type as it is detected (e.g., by a sensor), such that the instructions may cause the sensor to send data of the data type as it is detected in real-time or near-real time. The one or more first rates may be reporting data of the data type periodically at a first frequency, such that the instructions may cause the sensor to store data of the data type locally and send the stored data or a certain amount of the stored data periodically at the first frequency (e.g., once per day, once per hour, once per minute, etc.). The instructions may cause the sensors to store and/or send only a subset of the data of the data type, e.g., by sampling the data of the data type at the first sampling rate. The instructions may cause the sensors to send (as detected or store and send periodically) at a first sampling rate (e.g., every third datum of the data type) or to store all data of the data type and send data of the data type at the first sampling rate (e.g., every third datum of the data type) or to store data of the data type at a sampling rate greater than the first sampling rate and send data of the data type at the first sampling rate (e.g., store every other datum detected of the data type and send every third datum of the data type).

In the case of cumulative level modes, a sensor at a mode corresponding to a current level may also, or alternatively, send (or store) data associated with levels lower than the current level. According to the instructions indicated by the mode, data associated with the lower levels may be reported at a higher rate than the data associated with the current level. FIG. 3B shows the sensors for endpoint devices 341a-b and 351a-b are all at a mode corresponding to level 2, and according to the instructions indicated by the mode, the endpoint devices 341a-b and 351a-b may send (or store) data of data types associated with level 1 at a second frequency, a second sampling rate and/or a second amount. The second frequency may be greater than the first frequency, the second sampling rate may be greater than the first sampling rate and the second amount may be more than the first amount, or vice versa. Also, or alternatively, a mode corresponding to level 1 may indicate instructions that are configured to cause the sensors of the endpoint devices 341a-b and 351a-b to send (and/or store) data of data types associated with level 1 at a third frequency, a third sampling rate and/or a third amount, where the third frequency may be less than the second frequency, the third sampling rate may be less than the second sampling rate and the third amount may be less than the second amount.

Information indicating modes associated with sensors and/or associated devices may be stored in one or more databases, which may comprise one or more tables (e.g., generated and maintained by the computing device 122). The information indicating the modes associated with the sensors may be updated periodically (e.g., once per week, once per day, once per minute, etc.). Modes may be adjusted for sensors (e.g., information indicating a different mode than a current mode may be sent to the sensors and/or corresponding information stored in the one or more databases may be updated with the different mode) based on data (e.g., received and analyzed by the event analyzer 301 and/or computing device 122) indicating a security event or a network event, and/or a change in a severity of a previously detected security event or network event. Security events and network events will be discussed in more detail below. Instructions indicated by modes associated with one or more first levels may be updated to include instructions to send (and/or store) data of a data type or subset of a data type assigned to a second level. The computing device 122 may set a mode for a sensor and/or associated device by sending, to the sensor, information indicating the mode that indicates instructions for storing and sending data according to the mode. A mode may be updated for the sensor by replacing information indicating the mode associated with the sensor with information indicating an updated mode and sending information indicating the updated mode to the sensor, as discussed above. Also, or alternatively, sensors may know and maintain information indicating their modes. A mode may then be updated (e.g., changed) for a sensor that knows or maintains its own mode based on instructions, received by the sensor, causing the sensor to change the mode to the updated mode. For example, in a case that the modes are ordered according to a level of reporting (e.g., on a scale from 1-5, with level 5 corresponding to instructions to report and/or store the most data and/or data types, and level 1 corresponding to instructions to report and/or store the least data and/or data types), the instructions to update a mode for a sensor may comprise instructions to change to a mode corresponding to a specific different level (e.g., change from a mode corresponding to level 4 from a mode corresponding to level 2) or to change to a mode corresponding to an increase or decrease in level (e.g. change to a mode corresponding to a level that is 1 greater than a current level or 1 less than a current level). The instructions to update a mode may comprise instructions for collecting and sending data according to one or more modes comprising the updated mode, or the sensor may already have instructions for collecting and sending data according to the one or more modes comprising the updated mode. If the sensor does not have instructions for collecting and reporting data according to the updated mode, it may request them.

The sensor and/or associated device may determine, based on the information indicating the updated mode for the sensor and the instructions for collecting and sending data according to the one or more modes, instructions indicated by the updated mode. The instructions indicated by the updated mode may cause the sensor to store and send data according to the instructions indicated by the updated mode.

The right portion of the table of FIG. 3B, under the heading "Data to be reported by endpoint sensors (cumulative)," indicates an example of data types that sensors may report according to different modes, which may correspond to one or more data levels. The computing device 122 may store information assigning data types to various data levels, such as in one or more tables. Data levels may be used to organize data types that are to be sent and/or stored in similar ways (e.g., due to similar relationships between the data types and security events, similar sizes and amounts of the data produced, similar types of devices that produce the data types, etc.). Organizing data types according to data levels may allow for easily generating instructions for sending and/or reporting data of different data types that belong to a same data level. Also, or alternatively, organizing data types according to data level may allow for substituting of sending and/or storing data of data types assigned to a same data level. Instructions for sending and/or storing data may be generated for each data level, and the data levels and associated instructions may be used to generate modes corresponding to one or more of the data levels. A mode corresponding to one or more data levels may indicate the instructions, generated for the one or more data levels, for storing and/or sending data of the data types assigned to the one or more data levels. The assignments of data types to the data levels may apply to all sensors configured to communicate with the computing device 122, or to a subset of the sensors. Data type assignments may be stored in tables associated with sensors for which the assignments apply. For example, each sensor may be associated with its own table storing data type assignments to data levels. The computing device 122 and/or sensors may store and manage information indicating data type assignments to data levels. The data types may be assigned to data levels based on assignment rules (e.g., provided by a user at a user interface of the computing device 122), an amount of data of the data type (e.g., produced by an endpoint, detected by a sensor, stored at the sensor or associated endpoint, received by the computing device 122), redundancy in data of the data type (e.g., compressibility of data of the data type), a probability of data of the data type being associated with a security event, or any combination thereof. The data types may be assigned to data levels based on heuristic rules of the event analyzer 301 for detecting security events. Also, or alternatively, the data types may be assigned to data levels based on user input (e.g., provided to the computing device 122 via an interface at the computing device 122 or in communication with the computing device 122).

The computing device 122 may know, request, or be provided with information indicating data types that can be detected, stored and/or sent by sensors in communication with the computing device 122. The computing device 122 may determine, based on a type of a network sensor or endpoint sensor, data types associated with the network sensor or endpoint sensor. The computing device 122 may receive, via a sensor, a device associated with the sensor or an external source, information indicating data types (e.g., a list of data types) associated with the sensor and/or the device associated with the sensor. For example, the computing device 122 may receive information indicating data types that the sensor and/or device associated with the sensor are configured to detect, monitor, analyze, process and/or produce. Different, but potentially overlapping, sets of data types may be associated with different types of endpoint sensors or network sensors. Examples of data types associated with endpoint sensors may comprise process logs (e.g., process starts) event logs, message logs, transaction logs, or other system logs of an associated endpoint device, event logs and analytic outputs of a sensor itself (e.g., antimalware logs and analytic output), server logs, etc. Examples of data types associated with network sensors may comprise network traffic logs (e.g., DNS activity logs, protocol activity logs, connection logs, HTTP session logs, encrypted web session logs, remote management session logs), network diagnostics logs, etc.

A sensor need not necessarily report all of its detected and/or generated data. A sensor may be instructed to report a small amount of data in order to conserve network bandwidth, but the sensor may generate and store a large amount of sensor data, which might not be reported but may be retrieved later in case of a security event. To this end, a sensor may be instructed to use one mode for reporting sensor data, and a different mode for the storage of sensor data. The different modes may instruct (e.g., indicate instructions that instruct) the sensor as to which data it should be reporting, and which data it should be storing.

As noted above, the different modes may cause sensors to store, and/or report, different amounts of data. The different modes may correspond to the amount of resources that are available for the reporting and processing of sensor data. Some modes may be suitable if resources are plentiful, and sensors have the luxury of storing and/or reporting large quantities of data. Other modes may be more suitable if resources are constrained. When resources become more and more constrained, the limited sensor resources should be used for the sensor data that is of most value in detecting security events. To indicate this value, an information density metric may be determined for each data type. This information density metric may be directly proportional to the probability that the type of sensor data is indicative of a security event. For example, over time, it may be determined that one data types is statistically highly indicative of a security event. That data type may have a higher information density metric than other data types because data of the data type is very useful for indicating a security event. Conversely, if other data types are only marginally useful for identifying a security event, then those other data types might have a lower information density metric.

The information density metric may also be inversely related (e.g., inversely proportional) to a compressibility and/or a compression ratio of the sensor data. If a particular type of sensor data is highly compressible (e.g., highly redundant), then that data presumably can be more easily retrieved at a later time, if it is not included in the sensor's initial reporting. Accordingly, a data type's information density metric may be inversely proportional to that data's compressibility and/or compression ratio. Also, or alternatively, the information density metric may be reduced by (e.g., scaled inversely with) a bitrate and/or data size of data of the data type. Data of a data types may be produced in high enough amounts to potentially overwhelm other dataflow in a network (e.g., potentially block reporting of other data relevant to security events due to network constraints if it were all reported). Accordingly, the information density metric may be reduced by (e.g., scaled inversely with) a bitrate and/or data size of such data types.

The computing device 122 may assign a data type to a lower data level when it has a higher information density metric, and to a higher data level when it has a lower information density metric. An information density metric for a data type may be a high information density metric if it is above a threshold value (e.g., above 0.5 on a scale from 0-1) or if it is higher than one or more information density metrics for one or more other types (e.g., when compared to other information density metrics of a one or more other data types, higher that at least half of the other information density metrics). In this way a high information density metric for a data type indicates that data of the data type should receive higher priority for reporting (e.g., transmission to the computing device). Low level modes may indicate instructions to report data types assigned to low data levels (e.g., a sensor at mode 1 may report data at data level 1, only, on a scale from 1-5) and high level modes may indicate instructions to report data types assigned to high data levels and one or more lower data levels (e.g., a sensor at mode 5 may report data at data levels 5 and one or more of data levels 1-5 on a scale from 1-5. The information density metric may be scaled to match the data level values. For example, an information density metric may be calculated on a scale from 0-1, and a data type having an information density metric between 0.8 and 1 may be assigned to data level 1, a data type having an information density metric between 0.6 and 0.8 may be assigned to data level 2, a data type having an information density metric between 0.4 and 0.6 may be assigned to data level 3, a data type having an information density metric between 0.2 and 0.4 may be assigned to data level 4 and a data type having an information density metric between 0 and 0.2 may be assigned to data level 5.

Also, or alternatively, a sensor may be provided with a plurality of different information density metrics for different data types and information indicating a mode that indicates instructions to report and/or store data of a data type based on the information density metric values (e.g., report data having an information density metric above a threshold, and not report data having an information density metric below the threshold; report data having an information density metric of a first value or within a first range of values at a first rate and report data having an information density metric of a second value or within a first range of values at a second rate, wherein the first rate and the second rate are proportional to the first value and the second value, respectively). The information density metric of the data type may be weighed against network bandwidth conditions. If network bandwidth is limited, for example, a threshold information density metric for reporting data may be set to a high value (e.g., 0.8 out of a scale of 1) such that only data of a data type having an information density metric of 0.8 and above are reported. Also, or alternatively, the information density metric may be used or applied only in limited network bandwidth conditions. The information density metric may be modified based on business conditions. For example, if a sensor monitors a device associated with a subscriber to a service, the information density metric of data from that sensor may be increased (scaled) to cause data from that sensor to be reported at higher levels.

The data levels may be defined by assigning data types to the data levels. Data level definitions may be adjusted by changing data type level assignments. To reduce total data storage and reporting (e.g., by the sensors and to the computing device 122 and/or event analyzer 301) and collection (e.g., by the computing device 122 and/or event analyzer 301) while ensuring that data of interest or data most likely to be useful in determining and/or monitoring a security event are reported to the computing device 122 and/or event analyzer 301, subtypes of data types may be assigned to different data levels. A subtype of a data type may be the data type having a particular attribute, such as information relevant to a security event, a security event type, or a source of interest (e.g., an application, a device, a sensor, etc., indicated to be of interest based on user input or a history of being involved with security events). For example, a data type of connection logs may comprise subtypes of TCP connection logs, User Datagram Protocol (UDP) connection logs and Internet Control Message Protocol (ICMP) connection logs, where TCP connection logs are connection logs indicating TCP connections (e.g., under a header indicating a connection type), UDP connection logs are connection logs indicating UDP connections (e.g., under the header indicating connection type) and ICMP connection logs are connection logs indicating ICMP connections (e.g., under the header indicating connection type). A filter or instructions to filter data of a data type based on the subtypes may be provided (e.g., to a sensor as part of, or with, instructions for reporting data according to a mode of a sensor, and/or to the sensor as part of a data level definition table). Each of the subtypes may be assigned to data levels independently from each other, and therefore may be detected, stored and reported by sensors independently from each other (e.g., at different rates, in different amounts, etc.). This may be useful, for example, if TCP connection logs are more likely to indicate a security event than UDP connection logs or ICMP connection logs (e.g., according to user input, based on criteria associated with security event types, according to historical data of security events stored by the computing device 122, and/or based on an ongoing or previous security event having a data signature involving TCP connection log information). TCP connection logs may be assigned to a lower data level than UDP or ICMP connection logs so that TCP connection logs may be reported (and/or stored) at greater rates and/or by more sensors than UDP or ICMP connection logs. As another example, event logs (e.g., of an operating system) may include a heading indicating event types of error events (e.g., significant losses of data or functionality), warning events (e.g., indicating potential future error events), information events (e.g., successful operations of applications, drivers or services), success audit events (e.g., successful audited security access attempts), and/or failure audit events (e.g., failed audited security access attempts). The data type of event logs may include subtypes filtered by the event type heading (e.g., error event logs, warning event logs, information event logs, success audit event logs, and/or failure audit event logs). Error event logs may be assigned to a lower data level than failure audit event logs, which may be assigned to a lower data level than warning event logs, which may be assigned to a lower data level than success audit event logs, which may be assigned to a lower data level than information event logs based on, for example, a probability that each event log type may be associated with a security event (e.g., indicate a security event).

Information may be received and/or stored (e.g., by the computing device 122 and/or event analyzer 301) indicating sources of interest, such as blacklisted sources (e.g., servers, websites, applications, or other sources of data that may be associated with previous or ongoing security events, or may be otherwise indicated to pose a potential security threat, such as by user input or a correlation of data produced by the blacklisted source with detected security events of a security event type, etc.). A subset of a given data type indicating a source of interest may be assigned to a lower data level than a remaining subset, of the data type, that does not indicate the source of interest (or any source of interest).

The event analyzer 301 may process data received via the sensors for indications of security events. The event analyzer 301 may be part of or separate from the computing device 122, and the functions performed by the event analyzer 301, as described below, may be performed by the computing device 122. The event analyzer 301 may store and/or access a list (e.g., in the form of a table or database) of security event types and associated criteria defining the security event types. Security event types may comprise, for example, detection of malware (e.g., computer viruses, worms, Trojan horses, ransomware, spyware, adware, rogue software, wiper and scareware), unauthorized user activities (e.g., logins, use of credentials, privilege escalation activities, unauthorized access to a network, computing system, application software, data, etc.), missed scheduled/expected events or actions (e.g., a failure to receive an expected heartbeat message or response to a polling query), or any other type of event determined by the computing device 122 or a user of the computing device 122 to be a security event. Security event types and associated criteria may be determined based on heuristic rules or predefined event types and data types, and may be added to the list of security event types over time. An operator or user of the computing device 122 may add a security event type by providing input via an interface at the computing device 122 and/or the event analyzer 301, or at a device in communication with the computing device 122 and/or the event analyzer 301. The event analyzer 301 may receive information indicating sensor data patterns that have historically been associated with security events of one or more security event types. Examples of such sensor data patterns may comprise registry rewrites occurring more than a certain frequency (e.g., more than 100 times/minute), a number of missed heartbeat messages or polling replies (e.g., 1, 2, 3, etc.), permission changes occurring more than a certain frequency (e.g., 10 times/minute), failed log-in attempts, increased remote access of a device or service (e.g., 50% more than a historical number of remote accesses, or time of remote access), user and device mismatches, privileged account access sharing, or any other indicators of compromise (IoC). The sensor data patterns may be used as the criteria to determine whether a security event is detected. The sensor data patterns may be stored with a list of security events and/or security event types. The sensor data patterns may be compared with data received via sensors to determine whether the data indicates one or more sensor data patterns, in which case a security event of an associated security event type may be determined.

Security event types may be defined according to one or more sets of criteria. A set of criteria may indicate that a security event of a security event type has occurred or is occurring. The criteria may comprise conditions that may be satisfied based on data received via the sensors. The criteria may comprise data, received via a sensor, that comprise, or are accompanied by, information flagging the data (e.g., as suspicious or requiring further processing). The information flagging the data may be added via a sensor that detected and/or sent the data or via an intermediate sensor through which the data passed en route to the computing device 122. For example, an endpoint sensor, such as an anti-malware agent on an endpoint device (e.g., any of endpoint devices 341*a-b*, 451*a-b*), may determine a downloaded file to be suspicious based on its own analytics. The endpoint sensor may send log data indicating the file to the computing device 122 with information flagging the log data as suspicious or as indicating a download of a suspicious file. Also, or alternatively, the security event type of a download of a suspicious file on an endpoint device may be defined by criteria that comprise (1) download log data, of the endpoint device, indicating a file and (2) process start log data produced within a specified time frame following the download of the file consistent with a signature for a type of malware. In another example, the security event type of an unresponsive device may be defined by criteria comprising detection of a number of missed heartbeat messages (e.g., 1, 2, 3 or 4 missed heartbeat messages) or polling response messages. The event analyzer 301 may store and/or access information indicating security event types with associated sets of criteria. Different criteria may be stored for each security event type indicating that the security event has occurred, is occurring, and/or is resolved. Supplemental sets of criteria may be used to determine a severity of a security event. A severity of a security event may indicate a threat level of the security event (e.g., high, medium, low, resolved) and may be updated based on data received via the plurality of sensors.

The event analyzer 301 may allow for blacklisting specific endpoint devices, network devices or other data sources. The event analyzer may store and/or access rules for the blacklisted endpoint devices or network devices such that some or all data deriving from or indicating certain or all activities occurring on the blacklisted endpoint devices or network devices constitute a security event (e.g., blacklisted servers, websites, etc.). The event analyzer may also allow for whitelisting specific endpoint devices or network devices. The event analyzer may store and/or access rules for the whitelisted endpoint devices or network devices such that data that would otherwise be determined, by the event analyzer and/or computing device 122, to constitute a criterion for a security event are not so determined because the data derive from, are produced by or indicate activities occurring on a whitelisted endpoint device or network device.

The event analyzer 301 and/or the computing device 122 may determine, or receive, information indicating network conditions for the sensors, and/or devices being monitored by the sensors, in communication with the computing device 122. The computing device 122 may use network conditions to optimize the use of available bandwidth for a given sensor and/or network (e.g., a current data transmission rate minus a maximum data transmission rate for a given connection, or a sum thereof over multiple connections). The event analyzer 301 and/or the computing device 122 may store or access information indicating different data level definitions that are associated with different network states/conditions, e.g., as shown in the right two columns in the tables of FIGS. 3B and 4B. If a network is in a high degree of use (e.g., 90% or greater of the maximum bandwidth is being utilized), such that available bandwidth is low, then the computing device 122 may instruct sensors of the network to only report critical information and/or to report information less frequently or according to a first set of data level definitions (e.g., as shown in the column labeled "second network state" in FIG. 3B. This may entail lowering a sensor's reporting mode and/or applying data level definitions associated with low bandwidth to the sensor, such as the data level definitions shown in the "second network state" columns of tables of FIGS. 3B and 4B. If the network is in low use (e.g., less than 25% of bandwidth is being utilized), and available bandwidth is plentiful, then the computing device 122 may raise the sensor's mode and/or apply data level definitions associated with high bandwidth to the sensor, such as the data level definitions shown in the "first network state" columns of FIGS. 3B and 4B, so that more data may be gathered. The computing device 122 may store and/or update the information indicating network conditions for the sensors and/or the associated devices. Network conditions may be a network bandwidth available to the sensors and/or associated devices, or latencies between the sensors and the computing device 122. The network bandwidth may be a low bandwidth, medium bandwidth, or high bandwidth (e.g., low bandwidth may be 1 Mbps and lower, medium bandwidth may be between 1 Mbps-1000 Mbps, and high bandwidth may be 1000 Mbps and above). Alternatively, low, medium and high available bandwidth may be defined relative to a historical average available bandwidth for the sensor (e.g., low bandwidth may be 10% historical average available bandwidth and lower, medium bandwidth may be between 10-90% historical average available bandwidth, and high bandwidth may be 90% historical average available bandwidth or higher). Low, medium and high bandwidths may be defined based on user input. Similarly, latencies may be determined to be high, medium or low based on threshold values or relative to historical averages (e.g., low latency may be characterized by network delays of 50 milliseconds and lower, medium latency may be characterized by delays between 50 and 500 milliseconds, and high latency may be characterized by delays of 500 milliseconds and above). Network conditions may be averaged over all sensors in communication with the computing device 122 or within a given network (e.g., enterprise network 310 or public network 320 or a subnetwork thereof). The event analyzer 301 and/or computing device 122 may determine network conditions based on data received via the sensors. One or more data types may be assigned to different data levels based on network conditions. For example, the portion of the table of FIG. 3B under the heading "Data to be reported by endpoint devices (cumulative)" shows assignments of data types to data levels 1-5 based on a first network state (left column) and a second network state (right column) (e.g., high bandwidth and low bandwidth conditions). In general, in low bandwidth conditions, data types may be assigned to higher data levels than at higher bandwidths. Assignment of a data type to a data level may be based on a comparison of an amount of data of the data type reported by one or more sensors to bandwidth conditions experienced by the sensor. Assignments of data types to data levels may be based on network conditions, and data type assignments may be predefined and stored for predefined network conditions, for example, as shown in the first and second network state columns in FIG. 3B. Additionally, subtypes of data types may be independently assigned to data levels for different network conditions to achieve different granularities of data and potentially reduce the amount of data sent by sensors at low bandwidth or high latency network conditions, for example.

A network events may be an change in bandwidth that is large enough to trigger adjusting data level definitions and/or modes of sensors. A network event may be defined as an increase or decrease in bandwidth by a certain amount (e.g., a predetermined amount per sensor or over a network). A network event may be part of, or indicate (e.g., be a criteria of) a security event (such as a denial-of-service attack) or may be independent of a security event (such as loss of a router or cable break), but may indicate that network bandwidth has changed such that overall reporting should be decreased or may be increased. An increase or decrease in bandwidth may be determined to be a network event for one or more sensors based on a comparison of the amount of data received from the one or more sensors with an amount requested from the one or more sensors. A network event may be determined for one or more sensors based on a failure to receive expected data from the one or more sensors. A network event may be determined for a set of sensors and/or devices based on a failure to receive expected data of at least a threshold amount (e.g., a minimum percentage of a previously received amount or of an amount requested, such as 80%, 70%, 60% . . . 0%, etc. of an amount of data requested from the set of sensors and/or devices), for at least a threshold time period (e.g., a second, a minute, an hour, a day, etc.) and/or from at least a threshold number of sensors in a network (e.g., all sensors in the network, half of the sensors in the network, one sensor in the network, etc.). A network event may be determined to occur based on receiving, from one or more sensors, one or more requests for a change in reporting mode. The network event may be determined to occur for the one or more sensors that sent the requests and/or associated devices. The network event may be determined to occur locally (e.g., affecting a subset of devices within a local or small area network or portion of a network) or globally (e.g., affecting a majority of sensors and devices in communication with the computing device 122 or in a network). The event analyzer may identify one or more sensors affected by the network event and provide information indicating the network event and sensors and/or associated devices affected by the network event.

The event analyzer 301 may deduplicate redundant data received via the sensors. Multiple sensors may report data indicating a same event (security event or other event) or same or overlapping information. Based on receiving data comprising the same or overlapping information from multiple sensors, the event analyzer 301 may select and send data reported by one of the multiple sensors to the computing device 122 and discard the remaining data. Additional information may be added to the selected data, and the additional information may indicate the multiple sensors that reported data indicating the same event or the same or overlapping information.

The computing device 122 may adjust data level definitions and/or modes for one or more sensors based on detection of a security event and details of the detected security event. Adjusting a data level definition to include a different data type may cause the data type to be included in a different mode. The data level definitions may be adjusted by reassigning a data type to a different (e.g., lower) data level for a time frame before, during and/or after the security event. A sensor at a mode corresponding to one or more data levels (e.g., indicating instructions to send and/or store data from the one or more data levels according to instructions corresponding to the one or more data levels) that previously did not include the data type may receive information indicating the adjusted data level definitions and send and/or store data of the data type according to the instructions and the adjusted one or more data levels. The data type may be a data type produced in high volumes, having high compressibility, having a low probability of indicating a security event, etc., and therefore may be initially assigned to a high data level, which may correspond to modes that are usually applied to sensors involved or related to detected security events. As such, the data of the data type may initially not be reported by the sensors, as they may all be set to reporting modes corresponding to lower data levels, and/or may be reported initially at low rates by few sensors. In an example, registry reads and/or edits may occur on a device thousands of times per second. The endpoint device may run a systems log program that logs the registry reads and/or edits. The data types of registry read logs and registry write logs may be assigned to a high data level (e.g., data level 5), due to their high volumes, high redundancy, and low probability of being associated with a security event (e.g., as may be determined based on stored or learned rules of the computing device 122. Also, or alternatively, data types of registry read and write logs may have a low information density metric. However, if the computing device 122 receives data, from a sensor associated with the endpoint device 341a, indicating a security event of spyware on the endpoint device 341a, the computing device 122 may adjust data level definitions for one or more sensors by assigning registry read logs and/or registry write logs of the endpoint device 341a to a lower level, such as 2 on a scale from 1-5, while registry read logs and/or registry write logs produced by the endpoint devices 341b and 351a-b may still be assigned to data level 5. The one or more sensors may be a sensor associated with the endpoint device 341a, and/or a sensor associated with multiple endpoint devices comprising endpoint device 341a. The adjusted data level definitions may be applied by sending instructions to a sensor to edit a stored data level definition table. The sensor may then begin or continue to report and store data according to the adjusted data level definition table and a mode of the sensor, i.e., to send and/or store data types of registry read and registry write logs according to instructions for sending and storing level 2 data according to the mode. The adjusted data level definitions may be applied for a time period (e.g. 1 day, 1 hour, 1 minute, etc.) or until data received by the computing device 122 indicates that the security event (e.g., of spyware on the endpoint device) is no longer occurring or no longer a threat (e.g., criteria associated with the security event are no longer satisfied by the data). The adjusted data level definitions may be applied retroactively for a time period before a time point at which the security event was detected or determined to have begun to occur. Adjusted data level definitions may be applied (e.g., by a sensor) retroactively by determining (e.g., by the sensor) a difference between data that was reported over the retroactive time period given the original data level definitions and data that would have been reported over the retroactive time period given the adjusted level definitions and, to the extent possible, reporting the difference. For example, data stored at the sensor or an associated device may be reported at a rate or in an amount that the data would have been reported, based on the mode of the sensor and the adjusted data levels, during the retroactive time frame. The data level definitions may be adjusted multiple times based on the detection of the security event. For example, the data level definitions may be adjusted to reassign a data type from an original data level (e.g., 3) to a first low data level (e.g., 1) for a first time period, and then to a second data level (e.g., 2) for a second time period, etc.

The data level definitions may be adjusted by reassigning a subset of a data type, selected based on one or more details of the detected security event to a different data level than remaining data of the data type. For example, rules may be stored for a security event type that data level definitions for one or more sensors should be adjusted to reassign a subtype of a data type from a first data level to a second data level, based on the subtype of the data type indicating data of the datatype having one or more attributes related to the security event. The one or more attributes may comprise being produced or detected within a time frame before and/or after a time point associated with the detected security event, being produced by or received from a particular source, indicating a specific host or user id, indicating a particular port, comprising a minimum number of bytes, indicating a minimum number of bytes in a network connection, etc. The one or more attributes may be selected based on a relationship between data of the datatype comprising the attribute indicating a spread or progression of the security event, or based on data of the datatype comprising the attribute differentiating between security event types that may be indicated by a same set of criteria. For example, data may be received from a sensor that satisfies criteria indicating more than one potential security event types, one of which may be a localized security event type, (e.g., localized to one or more devices associated with the sensor), and the other may be a decentralized security event (e.g., a botnet attack). Data level definitions may be adjusted for sensors in a network of the sensor by assigning a subtype of a data type to a data level lower than a data level of the remaining data type, wherein the subtype indicates data of the data type produced within a time frame before and/or after a time point associated with the security event.

The event analyzer 301 may determine that data, received from one or more sensors, satisfy criteria indicating a security event has occurred. The security event may be determined to have an associated time point t and to be of a security event that may be or become decentralized, propagate or be time sensitive. The data indicating the security event may comprise one or more time stamps that indicate a time point t at which the security event is determined to have begun. Alternatively, after receiving the data, the event analyzer 301 may add a time stamp to the data indicating a time of receipt. The time of receipt may be used to determine a time point t associated with the security event. The event analyzer 301 may determine a time point t associated with the security event to be a time at which criteria indicating the security event are satisfied be the received data. Based on the time point t, the computing device 122 may access stored rules associated with the security event type that may comprise a rule to decrease a data level assignment for data of certain data types produced or detected within a time frame (e.g., before and/or after the time point t). Data produced before the time point t may be sent from a storage of a sensor and/or associated device. The time frame may be, for example, within 1 day, 1 hour, 1 minute, 1 second before and/or after time point t. The time frame may be asymmetrical in time around time point t. For example, based on a security event determined to have occurred beginning at time point t data of a data type produced during a time frame from 2 days before the time point t to 5 days following the time point t may be assigned to a data level that is one less than the remaining data of the data type.

Figure 4A:
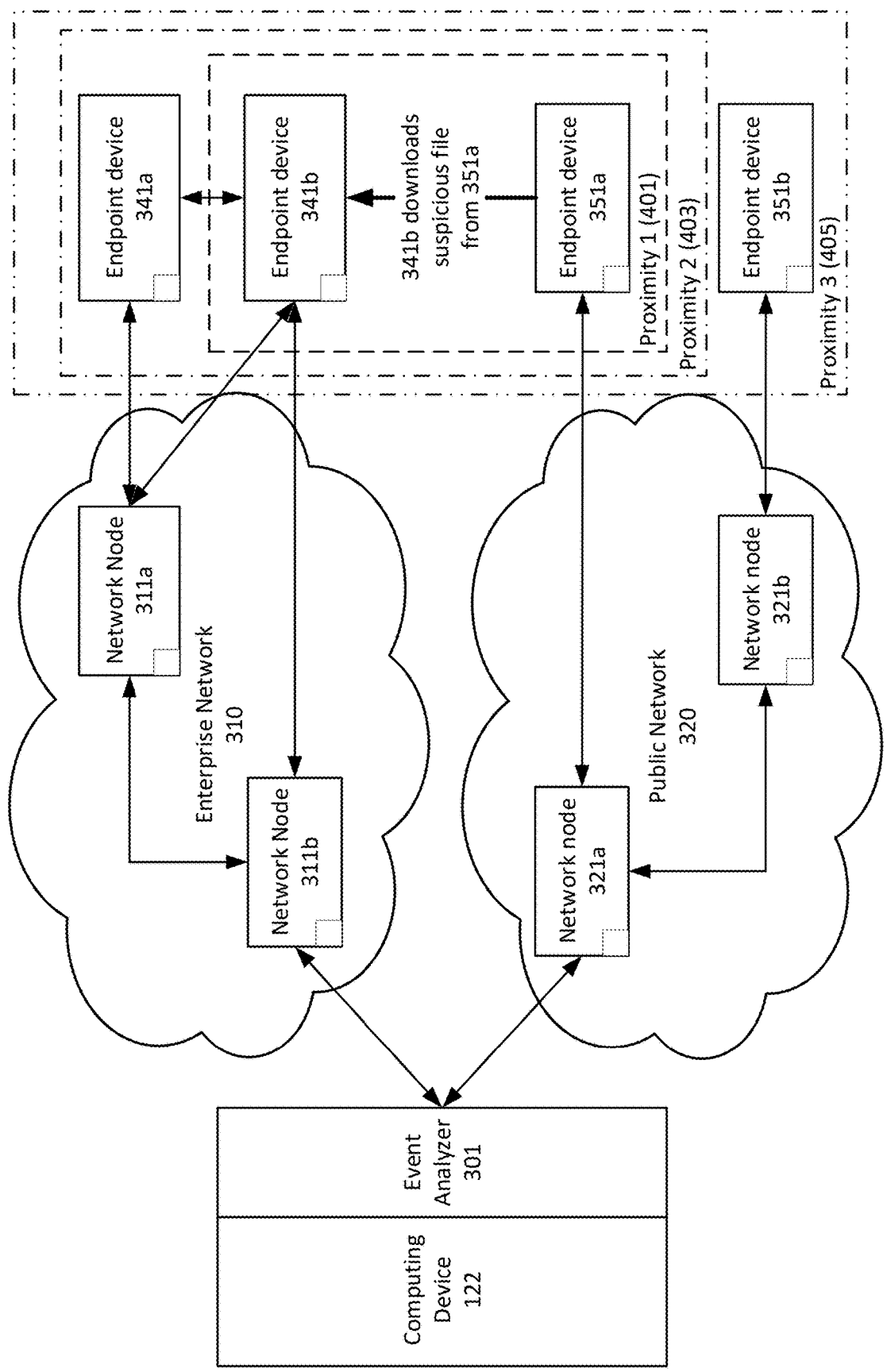
FIG. 4A shows an example of the system for data collection management of FIG. 3A following detection of a security event.

FIG. 4A shows the system of FIG. 3A following detection of a security event of a download of a suspicious file. The computing device 122 may receive data indicating a suspicious file was downloaded by endpoint device 341b. The data may additionally indicate the suspicious file originated from endpoint device 351a. The data may be a log file, from a sensor configured to performed its own analytics (e.g., an anti-malware program running on endpoint device 341b), indicating the downloaded file is suspicious or harmful. Also, or alternatively, the data may comprise a download log file (e.g., of an operating system running on endpoint device 341b) and the event analyzer or another sensor may receive the download log file and determine the downloaded file is suspicious or potentially harmful. For example, endpoint device 351a may be a blacklisted device, according to information maintained by the computing device 122, or the computing device 122 may store rules that endpoint devices on enterprise network 310 are not authorized to download files from an public network 320. Network node 311b may run, or be monitored by, a network sensor that analyzes traffic passing through network node 311b (e.g., a packet analyzer). A sensor associated with network node 311b, the event analyzer 301 and/or the computing device 122 may receive the download log sent from endpoint device 341b and determine that the download is unauthorized and/or the downloaded file is suspicious.

Modes of sensors may be adjusted based on one or more proximities of the sensors to a security event (e.g., a proximity to one or more devices experiencing or involved in the security event, to a network experiencing the security event, to a network connection associated with the security event, to a user account associated with the security event, to a program associated with the security event, etc.). The computing device 122 may define, or receive information defining, one or more proximities associated with a security event based on data indicating the security event. A proximity may be a physical, network and/or data-based proximity of a sensor and/or an associated device to one or more devices, networks, connections, programs, users, files, etc., associated with the security event. Multiple proximities may be defined for a security event. The multiple proximities may be ordered from a closest proximity to a farthest proximity relative to the security event. A first proximity may be defined as comprising one or more sensors and/or associated devices experiencing, or involved in, the security event. The one or more sensors and/or associated devices may be determined based on the data indicating the security event. For example, the one or more sensors and/or associated devices in the first proximity may comprise one or more sensors and/or associated devices that sent or produced the data indicating the security event. Also, or alternatively, the one or more sensors and/or associated devices may be one or more sensors and/or devices that may be indicated in the data indicating the security event. The one or more sensors and/or the associated devices determined to be within the first proximity may be selected for mode adjustment based on being within the first proximity. Subsequent proximities may be defined based on a physical, network and/or data-based distance from the one or more sensors and/or the associated devices within the first proximity (e.g., within 500 ft, in a same city, at a same premises, within 4 network hops, sharing a trunkline, sharing a client as an endpoint, sharing a server as an endpoint, running a same program, accessing a same file, being associated with a same user account, etc.). The proximities may also, or alternatively, be defined based on a temporal relationship to the security event, such that a sensor may be within a proximity if it is within the physical, network and/or data-based distance within a time frame of the security event (e.g., one minute before to 2 minutes after a time point at which a security event was determined to have begun). Sensors determined to be within a proximity of the security event may be selected for mode adjustment based on the proximity in which they are determined to be. Modes may be adjusted based on an order of the proximities, with larger modes adjustments (e.g., adjustments that result in a greater increase in data sent and/or stored, and/or data types sent/and/or stored) for sensors within closer proximities to the security event and smaller level adjustments (e.g., adjustments that result in a smaller increase, or decrease, in data sent and/or stored, and/or data types sent/and/or stored) for sensors within proximities further from the security event and outside of the closer proximities.

In the case of a suspicious file download, e.g., as shown in FIG. 4A, data indicating the download may comprise a download log file indicating a file name of the suspicious file, a source of the download (e.g., the endpoint device 351a), a host location of the downloaded file (e.g., the endpoint device 341b). The computing device 122 may store rules for defining proximities based on a security event of a suspicious file download detected based on receipt of a download log file indicating the file name. The rules may indicate that a first proximity (Proximity 1 401) may be defined to comprise sensors associated with the source of the download and/or a host where the downloaded file is located. In FIG. 4A, the endpoint device 341b and the endpoint device 351a may be selected for mode adjustment based on the first proximity, as shown by the dashed box labeled Proximity 1 (401). The rules may indicate that a second proximity may be defined to comprise sensors associated with a device sharing a connection with the host and/or the source within a time frame (e.g., one hour, one minute, one second, etc.) of the suspicious file download. In FIG. 4A, a sensor of the endpoint device 341a may have reported data indicating a connection between the endpoint device 341a and the endpoint device 341b within the time frame of the time point at which the file was downloaded. Therefore, the endpoint device 341a may be selected for mode adjustment based on the second proximity, as shown by the dashed box labeled Proximity 2 (403). The rules may indicate that a third proximity may be defined to comprise sensors associated with a device within three network links of a source of the suspicious file. The endpoint device 351b may be selected for mode adjustment based on the third proximity, as shown by the dashed box labeled Proximity 3 (405). Other sensors, shown or not shown in FIG. 4A, may fall into the first proximity 401, the second proximity 403 and/or the third proximity 405. The dashed boxes show only endpoint devices 341a-b and 351a-b identified in the proximities 401, 403 and 405 for the sake of discussion.

Modes may be adjusted for sensors by different amounts based on being in different proximities of the security event. For example, FIG. 4B shows a table corresponding to the table of FIG. 3B with entries adjusted based on a security event as shown in FIG. 4A. The left portion of the table of FIG. 4B shows adjusted modes for the sensors of the endpoint devices 341a, 341b, 351a and 351b based on the security event and based on the proximities to the security event, as described above. Modes of sensors for endpoint devices 341a and 351b, selected based on the first proximity 401, are shown adjusted from mode 2 (default) to mode 5 (high). At mode 5, the sensors associated with endpoint devices 341b and 351a may report data of data types assigned to each of data levels 1-5 according to instructions indicated by mode 5. A mode of endpoint device 341a, selected based on the second proximity 403, is shown adjusted from mode 2 (default) to mode 4 (elevated). At mode 4, the sensor associated with the endpoint device 341a may report data of data types assigned to each of data levels 1-4 according to instructions indicated by mode 4. The endpoint sensor associated with endpoint device 341a does not report data of data types assigned to mode 5. A mode of endpoint device 351b, selected based on the third proximity 405, is shown adjusted from mode 2 (default) to mode 3 (slightly elevated). At mode 3, endpoint sensor associated with endpoint device 351b reports data of data types assigned to each of data levels 1-3 according to instructions indicated by mode 3. The endpoint sensor associated with endpoint device 351b may not report data of data types assigned to modes 4-5.

Data level definitions may be adjusted by reassigning data types and/or subtypes of data types to different data levels based on detection of a security event. The data types or subtypes may be selected to target data produced, detected or received within a time frame associated with a time point of the security event, and/or to target and receive data indicating a feature relevant to the security event. A feature relevant to the security event may be a time point, a process ID, a user ID or account number, a source, a host, a connection ID, a file name, etc., associated with (e.g., indicated in) the data that satisfied the criteria to detect the security event. Subtypes of data types may be defined as data of the data type indicating a feature relevant to the security event and the subtype may be assigned to a lower data level than the original data type, such that more data indicating the feature are reported.

For example, in FIG. 4B, the data level definitions under the heading "Data to be reported by endpoint sensors (cumulative)" are adjusted from the original data level definitions shown in FIG. 3B based on a security event associated with a time point t (e.g., a time point at which the security event is determined to have begun, or a time point at which the security event). For example, under the column heading "High bandwidth", process terminations ($t \pm \Delta t$), other process terminations, tasks ($t \pm \Delta t$) and other tasks, registry reads ($t \pm \Delta t$) and other registry reads are subtypes defined based on data types of process termination logs, task logs and registry read logs, where ($t \pm \Delta t$) indicates data, of the original data type, detected or generated within a time frame of $\Delta t$ before or after the time point t associated with the security event. The time frame may be asymmetric around the time point t, e.g. ($t-\Delta t_1$, $t-\Delta t_2$; where $\Delta t_1 \neq \Delta t_2$) Based on being reassigned to a different data level, a subtype or data type may be reported retroactively (e.g., from a storage of the sensor and/or the associated device) and/or at a different rate. For example, in FIG. 3B, process terminations are assigned to data level 4. Based on the data level definitions in FIG. 3B, a sensor at mode 4, which may report data of data types corresponding to data levels 1-4 according to mode 4 (and/or another mode indicating instructions to report data of data types assigned to data level 4) may report process terminations, but a sensor at a lower mode (and/or any mode that does not indicate instructions to report data types assigned to data level 4), such as sensors associated with endpoint devices 351a-b and 341 at level 2, may omit that information. FIG. 4B shows an example of data level definitions of FIG. 3B adjusted based on a security event associated with time t. In FIG. 4B, among other adjustments, process terminations (t±Δt) are shown reassigned to data level 3. A sensor at mode 3 (e.g., indicating instructions to report data types assigned to data levels 1-3) may receive an adjusted data level definition table and/or instructions based on an adjusted data level definition table and begin reporting process terminations (t±Δt) (e.g., process terminations that occurred within the time frame t±Δt). To report process terminations that occurred within a time frame before t and/or before receipt of the adjusted definition table and/or instructions, a sensor may retrieve unreported process terminations stored at the sensor and/or at the associated device.

The data level definitions may be readjusted to original level definitions based on rules associated with a security event type of the security event. The rules may indicate that data level definitions revert to original data level definitions after an amount of time following a time point associated with the security event (e.g., a time point at which the security event was detected or a time point at which the security event began). The amount of time may be based on historical data of the security event type indicating an amount of time for which the subtypes or adjusted data types may be relevant. Also, or alternatively, the rules may indicate that data level definitions revert to original data level definitions based on a determination that the security event has decreased in severity or has resolved and/or after all sensors for which the adjusted data level definitions were applied have reported the requested data, etc. For example, the data level definitions shown in FIG. 4B may revert to the data level definitions of FIG. 3B after an amount of time following time point t (e.g., one or more days, one or more hours, one or more minutes, etc.).

Figure 5A:
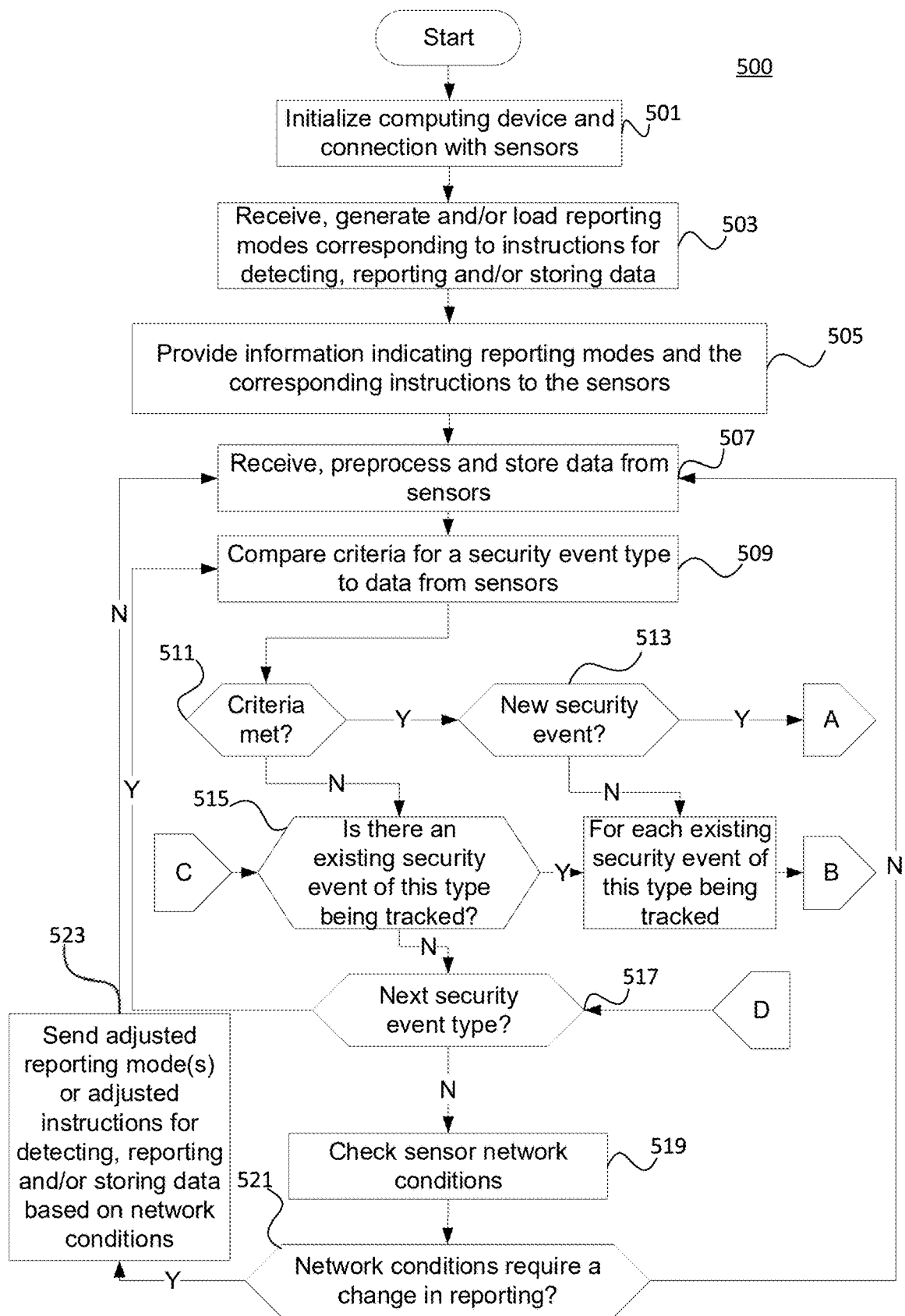
FIGS. 5A-5B is a flow chart showing an example method for data collection management.
Figure 5B:
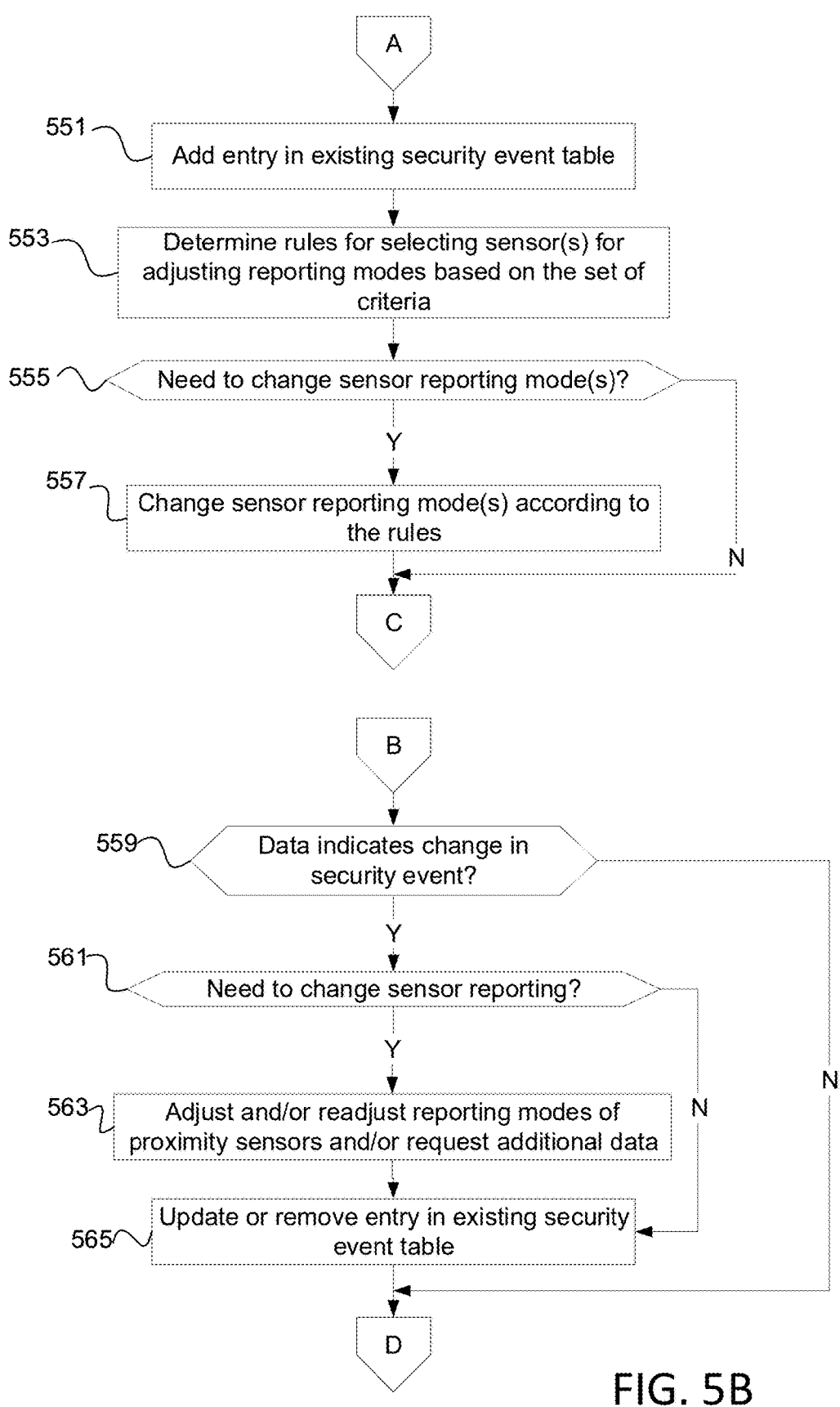

FIGS. 5A-B show a method for data collection management 500. Steps of the method 500 may be performed by the computing device 122 and/or the event analyzer 301, and may additionally be performed by, or in combination with, one or more sensors and/or associated devices in communication with the computing device 122 (such as network nodes 311a, 311b, 321a or 321b, endpoint devices 341a, 341b, 351a or 351b, and or associated sensors). In step 501 the computing device 122 may be turned on and/or initialized to begin collecting data. A plurality of sensors, and/or associated devices (e.g., devices to be monitored by the plurality of sensors), may be determined for which data storage and reporting may be managed. The plurality of sensors and/or associated devices may be determined based on one or more discovery protocols being performed on one or more networks over which the plurality of sensors may be configured to communicate. Also, or alternatively, information indicating one or more sensors of the plurality of sensors may be received via user input to an interface (e.g., of the computing device 122 or otherwise in communication with the computing device 122). The user input may comprise information identifying the one or more sensors and/or associated devices, such as an IP address for the endpoint devices 341a, 341b, 351a and/or 351b, and/or associated sensors. A list of the plurality of sensors may be generated and/or maintained (e.g., in a storage of, or accessible to, the computing device 122 and/or event analyzer 301). Multiple lists of sensors may be generated and/or maintained, such as a list of endpoint sensors that collect data local to one or more endpoint devices, through which information may enter or leave the network, (e.g., endpoint devices 341a, 341b, 351a and/or 351b), a list of network sensors that collect data local to one or more network devices, which distribute data throughout the network (e.g., network nodes 311a, 311b, 321a and/or 321b), a list of devices of interest (e.g., based on an association with a prior or ongoing security event, based on user input, etc.).

Initial network conditions may be determined for the sensors and/or the associated devices. Network conditions of the sensors may be used to set modes for sensors and/or assign data types to data levels corresponding to modes so as to efficiently use the available network resources. Alternatively, or in addition, the network conditions may be used to select a predefined scheme of data type assignments to data levels (e.g., stored in predefined data level definition tables, such as the right two columns in FIGS. 3B and 4B). A network condition may comprise a network bandwidth available to a sensor and/or an associated device, and/or a latency associated with the sensor and/or the associated device (e.g., between the sensor or the associated device and the computing device 122). The network condition may be determined based on a response to a request for information sent to the sensor and/or the associated device and/or to one or more network sensors or network devices on a network, of the one or more networks, over which the sensor may communicate. The information may indicate one or more of a bandwidth of the network and an amount of data traffic on the network, a maximum bandwidth and/or data usage of the sensor and/or the associated device, or available bandwidth of the sensor and/or the associated device. The information may also, or alternatively, indicate a response time from the sensor and/or the associated device (e.g., based on a ping response, traceroute response, etc.) The network bandwidth available to the sensor may be measured directly for the sensor and/or the associated device or may be based on an average available bandwidth for the sensors and/or the associated devices on the network. The network bandwidth may be classified as a low bandwidth, medium bandwidth, or high bandwidth (e.g., as discussed previously with respect to FIGS. 3B and 4B). Similarly, the latency may be classified as high, medium or low based on threshold latency values or relative to historical averages. Network conditions may be stored for each sensor (e.g., in an entry, of a table comprising the list of the sensors and/or the associated devices, for the sensor and/or the associated device). Rules for monitoring network conditions (e.g., based on data received from the sensors) and/or determining a network event based on a change in network conditions may be received and/or loaded (e.g., by the computing device 122 and/or the event analyzer 301). The rules may specify that network conditions be monitored for all or a subset of the sensors (e.g., for the one or more networks, a subnetwork, one or more of the sensors and/or their associated devices, etc.). The rules may specify criteria for determining that a network event has occurred for one or more sensors. The criteria that, if satisfied by the data, may indicate a network event may comprise one or more of a change in network conditions (e.g., network bandwidth) by at least a threshold amount (e.g., a percentage of a previous amount, such as 10%, 20%, etc.) or from a predefined category (e.g., low to medium, medium to high, etc.) or a request to change a mode received from the one or more sensors. The criteria may also, or alternatively, comprise criteria of one or more, or a threshold number, of requests for mode changes received from sensors. The criteria also, or alternatively, may comprise criteria of a reduction in data reported by at least a threshold amount (e.g., by at least 10%, 20%, 30%, etc., of a previous amount in and/or by at least a threshold number of sensors (e.g., by 10%, 20%, 30% of the sensors, by 10% of sensors at a certain mode, such as mode 1, 2, 3, etc.).

One or more data types associated with the sensors may be determined. The one or more data types may be one or more data types that a sensor of the sensors may be capable of producing, detecting (e.g., on one or more associated devices of the sensor, or received via the one or more associated devices, etc.), storing (e.g., on the sensor), causing storage of (e.g., on the one or more associated devices), and/or reporting (e.g., to the event analyzer 301 and/or the computing device 122). One or more requests for information indicating the one or more data types may be sent to the sensors. Also, or alternatively, information indicating data types associated with one or more sensor categories (e.g., antivirus, antimalware, operating system logging, network traffic monitoring, etc., plug-ins, applications, programs, or devices) and/or associated device features (e.g., make and/or model, operating system, etc.) may be received and/or stored (e.g., by the computing device 122). A sensor category of a sensor of the one or more sensors, and/or device features of a device associated with the sensor, may be determined based on the information indicating the one or more sensors and/or the associated devices. The sensor category and/or the device features of the sensor and/or associated device may be compared to the information indicating data types associated with the one or more sensor categories and/or device features. Based on the comparison, one or more data types may be determined to be associated with the sensor and/or the associated device. Also, or alternatively, information indicating one or more data types of interest to be collected may be received (e.g., based on historical data indicating the one or more data types being associated with one or more security event types, based on user input at the interface of, or in communication with, the computing device 122, etc.).

One or more security event type definition tables may be received and/or loaded. The one or more security event type definition tables may comprise one or more sets of criteria for each security event type (e.g., as discussed previously with respect to FIGS. 3A-3B). The one or more sets of criteria may be determined based on heuristic rules and/or predefined event type data patterns (e.g., malware signatures or behavior-based data patterns). A set of criteria of the one or more sets of criteria may comprise one or more data patterns that, based on being detected in data received via the plurality of sensors, may indicate that a security event of a security event type has occurred or is occurring. Another set of criteria of the one or more sets of criteria may comprise one or more additional data patterns that may indicate a severity of a detected security event, a change in severity of a detected security event and/or an end or absence of the security event (e.g., that the detected security event was resolved or was a false detection). Information indicating new security event types and associated sets of criteria may be received and/or determined (e.g., based on user input and/or based on learning data signatures or behavior-based data patterns associated with detected security events) to the security event type definition tables at any point during the method 500.

The one or more security event type definition tables may also comprise historical data associated with the security event types. Historical data associated with security event types may be used to determine and/or adjust criteria indicating security events of the security event types, to track sources (e.g., applications, devices, sensors etc.) of data associated with detected security events, and to track mode history of sensors associated with security events (e.g., sensors that reported data indicating a security event, sensors selected for level adjustment based on detection of a security event, etc.). The historical data may comprise frequencies of security events of the security event types, which may comprise overall frequencies, frequencies over one or more specific time periods (e.g., the past year, a specific day, or frequencies averaged over one or more time periods (e.g., mornings, evenings, weekends, weekdays, etc.). The historical data may also comprise frequencies of device types and/or specific devices associated with (e.g., affected by, involved in, producing data indicating) security events of the security event type, frequencies of sensor types and/or specific sensors being associated with (e.g., reporting data indicating, associated with a device affected by) security events of the security event types, frequencies of the sets of criteria being satisfied to indicate a security event of the security event type, etc. The historical data may be updated over time based on detection of one or more new security events.

In step 503, different modes may be determined. As noted above, different modes may respectively correspond to instructions for sending and/or storing data (e.g., of one or more data types, in different quantities, at different frequencies, etc.). Information may be received, generated and/or loaded corresponding modes to instructions for how much data, of one or more data types and/or data levels, to detect, report and/or store. The information may be stored and/or organized in one or more mode definition tables that include entries for each of one or more modes indicating instructions of how much of what types of data to detect, report and/or store at that mode. A mode may indicate instructions for sending and/or storing data of different data types based on different data levels of the data types. Data level definition tables (e.g., as shown in FIGS. 3B and 4B) for prioritizing data types to report may be generated by assigning one or more of the data types associated with the sensors to one or more data levels (e.g., adding information indicating the one or more data types to an entry for the data level in a data level definition table). A data level definition table may be generated for each sensor, and/or a data level definition table may be generated for multiple sensors for which same data level definitions will apply. For example, a single data level definition table may be associated with all of the sensors on a network in communication with the computing device 122. The one or more data types may be assigned to the one or more data levels based on one or more attributes of the data type and/or network conditions of the sensors, and/or a combination thereof.

The one or more attributes of the data type may include an amount of data of the data type, a redundancy of information in data of the data type, or a probability of data of the data type being associated with a security event. The amount of data of the data type may be an amount of data of the data type, in a units of data the data type (e.g., a number of log files) and/or in data size (e.g., bits in a log file or in a number of log files), produced by the sensor, received by the sensor and/or detected by the sensor on the one or more associated devices. The amount of data of the data type may be an amount of data produced, received or detected over a certain time period (e.g., a rate of production, receipt or detection), and may be an absolute amount of data (e.g., in bits) or a relative amount of data of the data type (e.g., relative to a total amount of data produced, received and/or detected by the sensor). The amount of data of the data type may be estimated based on historical amounts or rates of production, receipt or detection of data of the data type. The historical amounts or rates may be historical amounts or rates of data production, receipt or detection by the sensor and/or by one or more other sensors (e.g., an average over multiple sensors). The one or more other sensors may share one or more attributes with the sensor (e.g., a sensor category, as may have been determined in step 401, an association with one or more same devices or types of devices, an association with a same number of devices, etc.). The redundancy in data of the data type may be a redundancy of production or detection of data of the data type (e.g., the data may be produced redundantly by the device and/or within a network) and/or a redundancy of information in the data of the data type (e.g., data of the data type may comprise information indicating a property or process that does not change over time, or rarely changes over time, such as data indicating log rotations).

The probability of data of the data type being associated with a security event may be based on a probability of the data type being associated with one or more of the sets of criteria associated with the security event types. For example, one or more of the sets of criteria associated with the security event types may require receipt (e.g., by the event analyzer 301 and/or computing device 122) of data of the data type (e.g., at all, of at least a threshold amount, at least a threshold rate, within a specific time frame, indicating a specific source, etc.). Also, or alternatively, one or more criteria of the sets of criteria associated with the security event types may comprise a failure to receive or detect data of the data type (e.g., at all, or of at least a threshold amount, at least a threshold rate, within a specific time frame, from a specific source, etc.). The probability of data of the data type being associated with a security event may be based on a frequency of security events being detected based on receipt of data of the data type (e.g., 30% of security events may be detected based on receipt of data of the data type) and/or based on a historical amount of data of the data type that satisfied criteria that indicated a security event (e.g., 2% of data of the data type detected and/or reported by the sensor indicated a security event).

The data levels may generally be defined according to the cost and benefit of each data type. If a type of data has very low cost (e.g., is of small data size, is easily obtained by the sensor) and very high benefit for handling security events (e.g., provides pinpoint information for identifying the problem causing the event), then that data type may be assigned to a low data level. A data type associated with a sensor may be assigned to a higher data level for the sensor based on the data type being associated with a large amount of data (e.g., relative to other data types and/or relative to a network bandwidth, as will be discussed below), a high redundancy of information in the data (e.g., relative to other data types), and/or a low probability of data of the data type being associated with a security event (e.g., relative to other data types, relative to the amount of data of the data type, etc.). A data type associated with a sensor may be assigned to a lower data level for the sensor based on the data type being associated with a small amount of data, a low redundancy of information in the data, and/or a high probability of data of the data type being associated with a security event.

A data type may also, or alternatively, be assigned to a data level based on network conditions of the sensor (e.g., determined in step 501, and as discussed with respect to FIGS. 3A-3B). The data type may be assigned to a data level based on a comparison between an amount of data of the data type and network conditions of the sensors. For example, an amount of data of the data type expected to be produced on a device (e.g., based on historical data for that device or similar types of devices) may be compared to an available network bandwidth for a sensor associated with the device. Based on the comparison indicating that the amount of data is within a first range relative to the available network bandwidth (e.g., 0-1%), the data type may be assigned to a low data level (e.g., data level 1). Based on the comparison indicating that the amount of data is with a second range relative to the available network bandwidth (e.g., 2-5%), the data type may be assigned to a higher data level (e.g., data level 2). Also, or alternatively, a total amount of data associated with a plurality of sensors (e.g., a sum of the amounts of data of the data types associated with the plurality of sensors) may be compared to a total available network bandwidth for the plurality of sensors. Data types may be assigned to different data levels for the plurality of sensors based on the comparison indicating that the total amount of data being is within different ranges relative to the total available network bandwidth for the sensors.

Also, or alternatively, data type assignments may be received and/or generated and stored based on predefined network conditions and stored in one or more pre-defined network condition-dependent data level definition tables (e.g., as shown by the high bandwidth and low bandwidth columns in FIGS. 3B and 4B). Data types may be assigned to higher data levels in low bandwidth network conditions than in high bandwidth network conditions (e.g., based on a comparison of amount of data of the data types to network bandwidth assignment rules, as discussed above). The pre-defined network condition-dependent data level definitions may each be loaded and used based on detected network conditions. A network event indicating a change in network conditions by a pre-defined or threshold amount may result in a change in which pre-defined network condition-dependent data level definition table is used. Also, or alternatively, such a network event may trigger a change in modes for one or more sensors (e.g., sensors affected by the network event).

The one or more mode definition tables may comprise instructions for sensors to send and/or store data of the data types assigned to each data level. The instructions may comprise instructions to send (or store) data of the data types based on a mode of the sensor. For example, a sensor at mode 2 may send data of data types assigned to data level 2 at a first rate, a first sampling rate and/or a first amount, and the sensor at mode 3 may send data of the data types assigned to data level 2 at a second rate, a second sampling rate and/or a second amount. The second rate, second sampling rate and/or second amount may be greater than the first rate, the first sampling rate and/or the first amount, based on mode 3 corresponding to a greater level of reporting than mode 2. As discussed previously with respect to FIG. 3B, the first rate for sending (or storing) data of the data type may be as-detected, periodically at a first frequency (e.g., the sensor may store data as-detected and send the data, or a subset thereof, periodically, such as once per day, once per hour, once per minute, etc.) and/or conditionally (e.g., the sensor may store data as-detected and send the data, or a subset thereof, based on a condition being met, such as a threshold amount of the data being stored, or the data being detected at or above a threshold rate, etc.). The instructions may comprise instructions for the sensors to store and/or send only a subset of the data of the data type by sampling the data of the data type at the first sampling rate. The instructions may comprise instructions for the sensors to send (as detected or store and send periodically) at a first sampling rate (e.g., every third datum of the data type) or to store all data of the data type and send data of the data type at the first sampling rate (e.g., every third datum of the data type) or to store data of the data type at a sampling rate greater than the first sampling rate and send data of the data type at the first sampling rate (e.g., store every other datum detected of the data type and send every third datum of the data type).

One or more sets of mode-dependent criteria associated with security event types may be generated based on the level definition tables for the sensors and the sets of criteria associated with the security event types in the one or more security event type definition tables. Mode-dependent criteria may be criteria for comparison to data from sensors at a mode associated with the mode-dependent criteria. Mode-dependent criteria associated with a security event type may be generated by modifying criteria associated with a security event type based on the instructions for sending and/or storing data indicted by the mode (e.g., based on different data types to be sent and/or stored according to the mode). For example, a set of criteria for detecting a security event of a security event type may be data indicating a number of logins exceeding a number module loads on a device over a time period (e.g., a minute). Considering the modes and data level definition table in FIG. 3B, any of the sensors associated with endpoint devices 351a-b or 341a-b at mode 1 may report logins, but not module loads. Therefore, security events of the security event type may not be detected based on data sent by a sensor at mode 1 (e.g., reporting data at data level 1, only). A set of mode 1 criteria (e.g., criteria to be compared to data received from mode 1 sensors, only) may be generated from the original set of criteria by modifying the original set of criteria to include only the data types assigned to data level 1. For example, a set of mode 1 criteria corresponding to the original criteria may be data indicating more than 1000 logins per minute (e.g., based on historical data for module load rates for devices indicating a historical rate of 1000 module loads per minute). A set of mode 2 criteria may be the original criteria of logins exceeding module loads.

Rules for adjusting data collection based on detection of security events may be determined. A set of rules for adjusting data collection may be received or generated and stored in the security event definition table for a set of criteria associated with a security event type (e.g., a set of rules may be stored for each set of criteria). The set of rules may specify one or more actions to take and/or data to collect based on the set of criteria satisfied and/or one or more modes of one or more sensors that sent data satisfying the set of criteria. For example, the set of rules for the set of mode 1 criteria discussed above may specify raising a mode of the sensor that sent the mode 1 data to mode 2 for a set period of time (e.g., one minute) to determine whether or not the set of mode 2 criteria for the security event are also satisfied by data sent form the sensor. Also, or alternatively, the rules may specify raising the mode of the sensor retroactively (e.g., instructing the sensor to report stored data that would have been reported at mode 2 during the time period corresponding to time during which the mode 1 data that satisfied the set of mode 1 criteria was sent). In a case that the set of criteria is shared by multiple security event types, the rules may specify adjusting data collection to differentiate between security event types.

The rules for adjusting data collection may comprise rules for selecting one or more sensors for mode adjustment and/or data level definition adjustment. The rules for selecting one or more sensors for mode adjustment may comprise rules for determining sensors in one or more proximities associated with security events of the security event types (e.g., as discussed above with respect to FIGS. 4A-4B). The rules for determining the one or more proximities may comprise information indicating one or more proximities and security event-specific information that may be used to determine the sensors in the one or more proximities. In the example of a suspicious file download discussed above with respect to FIGS. 4A-4B, an entry in a security event type definition table for a suspicious file download security event type may comprise information indicating three proximities: a first proximity 401 comprising a source of the suspicious file and/or a host on which the suspicious file was downloaded, a second proximity 403 of sensors a network connection with the host or the source of the downloaded file within a time frame of the download (e.g., within one second) and a third proximity 405 of sensor within three network links of a source of the suspicious file. The entry in the security event type definition table may also comprise information indicating security event-specific information (e.g., to be determined from data satisfying the criteria indicating the security event or additional data identified based on the detected security event), such as a time point associated with the security (e.g., one or more time stamps in data indicating the security event, a time point at which the security event was detected), a host identifier, a source identifier, connection log data indicating the host and/or the source, network topology data for a network comprising the source, etc. The entry in the security event type definition table may comprise rules for applying the security event-specific information to the information indicating the one or more proximities to determine any sensors within the one or more proximities.

The one or more proximities may be determined based on a probability of data from sensors in the one or more proximities to be relevant to a security event of the security event type. Proximities for a security event type may be based on a distribution pattern and/or a progression pattern associated with the security event type. The distribution pattern and/or progression pattern may be based on historical data of security event types for the security event type. For example, based on a security event type being associated with a highly localized distribution pattern (e.g., involving and/or affecting a limited number of devices, such 1, 2, 3, devices, etc.) and/or a limited progression pattern (e.g., having a limited tendency to spread to other devices, to other locations on a device, etc.), the one or more proximities may comprise devices involved in and/or affected by the security event (e.g., determined based being indicated in the data satisfying the criteria indicating the security event). In another example, based on a security event type being associated with a highly distributed distribution pattern (e.g., involving and/or affecting a large number of devices, such as in a botnet attack) and/or a progressive progression pattern (e.g., having a tendency to spread from one device to one or more other devices and/or from one location on a device to one or more other locations on the device, etc.), the one or more proximities may comprise a first proximity of devices involved in and/or affected by the security event according to the data indicating the security event (e.g., satisfying the criteria indicating the security event), and/or one or more additional proximities based on the distribution pattern and/or progression pattern. Additionally, or alternatively, in a case that multiple security event types are associated with a same set of criteria, and the multiple security event types are associated with different distribution patterns and/or progression patterns, the one or more proximities may be determined based a combination (e.g., a union, a sum, an average, etc.) of the distribution patterns and/or progression patterns. The one or more proximities may comprise a set of ordered proximities, wherein a first proximity is closer to the security event and/or devices involved in the security event, a second proximity is further than the first proximity, a third proximity is further than the second proximity, etc. The one or more proximities may comprise a blanket proximity of all sensors for blanket mode adjustments and/or blanket data level definition adjustments.

The rules for adjusting data level definitions of the one or more selected sensors may comprise rules for adjusting the data level definitions based on data patterns associated with the one or more proximities. Data level definition adjustments may be based on a one or more data patterns associated with the one or more proximities of the security event. The one or more patterns may comprise a change in production of a specific data type or a subtype of a data type for devices within a proximity of the security event. The rules for adjusting data level definitions may comprise rules to reassign the data type or subtype of the data type from an original data level to an adjusted data level for the one or more sensors based on modes of the one or more sensors (e.g., if a sensor of the one or more sensors is already at a mode that indicates instructions to send data of the data type, data level definitions for that sensor may not be adjusted). The rules for data level definition adjustments may comprise rules to collect data from the one or more sensors in the proximity for a time period and determine whether the adjusted data from the one or more sensors is consistent with and/or indicates the change in production of the data type. The rules for data level definition adjustment may comprise rules to readjust the data level definitions to original data level definitions based on the adjusted data being inconsistent with the change in production of the data type (e.g., no change detected and/or an opposite change detected), which may indicate that the detected security event is no longer occurring, was falsely detected (e.g., the criteria were satisfied, but indicated another event or some stochastic event, and did not indicate an actual security event of the security event type) or is of low severity.

The rules for adjusting modes of the one or more selected sensors may comprise rules for adjusting the modes based on data patterns associated with the one or more proximities. Modes may be adjusted for a sensors associated with a proximity based on a probability that data of data types reported according to an adjusted mode may be relevant to the security event (e.g., satisfy a criteria of a set of criteria for the security event type indicating a severity of the security event, satisfy a criteria of a set of criteria for another security event type that may also be indicated by the set of criteria that was satisfied to indicate the security event of the security event type). Also, or alternatively, modes may be adjusted for the one or more sensors in a proximity when there is no stored data pattern for the proximity (e.g., a data pattern may not be known for the proximity or multiple possible mechanisms or other security events may underly or be consistent with the detected security event, making multiple data patterns possible). The rules for adjusting modes of the one or more selected sensors may comprise rules to adjust the modes using probabilities that data from sensors in the one or more proximities are relevant to the security event of the security event type. A sensor in a proximity having a high probability of sending data relevant to the security event (e.g., likely to be affected by the security event, as indicated in historical data for sensors in the proximity for previous security events) may be adjusted to a higher mode (indicating instructions to send and/or store more data, more frequently, of more data types, and/or of higher data level data types) than a sensor in another proximity having a low probability of sending data relevant to the security event.

In step 505, information indicating modes may be sent to the sensors (e.g., sensors associated with the devices 311*a-b*, 321*a-b*, 341*a-b* and/or 351*a-b*). The sensors may have, or be sent, the information corresponding the modes to instructions for how much, and what types, of data to detect, store and/or report based on the assigned level. The instructions may comprise one or more mode definition tables and/or level definition tables from step 503. For example, a sensor may receive information indicating a mode. The message may include a mode definition table and/or a data level definition table, and/or the sensor may load a stored mode definition table and/or data level definition table. The sensor may retrieve, from the mode definition table and according to the mode, instructions that indicate how much, and of what types, of data to detect, store and/or report according to the mode. The sensors may initially be assigned to default modes. The default modes may be a same mode for all sensors (e.g., a mode 2, for reporting data types in data levels 1-2 on a scale from 1-5, as shown in FIGS. 3B and 4B). Also, or alternatively, the default modes may be different for different sensors or different subsets of sensors. The default modes may be selected to balance probabilities of detecting security events with data reporting and storage limits based on network conditions and/or data handling capabilities (e.g., a memory, a processing speed, processing and/or analytic capabilities, etc.) of the sensors, their associated devices, the computing device 122 and/or the event analyzer 301. Data handling capabilities of the sensors may be determined based on information received in step 501 (e.g., in response to the discovery protocol performed, based on the user input, in response to the request for information, etc.). For example, a default mode may be selected for one or more sensors such that data of data types associated with the one or more sensors and assigned to data levels reported according to the mode could satisfy at least a minimum percent of the sets of criteria stored in the one or more security event type definition tables, or could satisfy sets of criteria associated with a minimum percent of historically detected security events (e.g., 10%, 20%, 30% of historically detected security events detected based on sets of criteria satisfied by data of the data types.). Also, or alternatively, the default mode may be selected for the one or more sensors such that a total amount of data of the data types associated with the one or more sensors (e.g., a sum of data of the data types produced, received or detected over time) is less than a threshold amount of data based on network conditions and/or data handling capabilities of the sensors (e.g., the total amount of data is a less than 50% of the available bandwidth for the sensors). Also, or alternatively, a default mode may be selected based on historical data indicating that the sensor and/or similar sensors have been associated with security events (e.g., a sensor that was previously associated with a security event may have a default mode that corresponds to higher levels of reporting than a default mode for a similar sensor without a history of being associated with a security event). A default mode may be selected based on user input (e.g., a user may specify one or more sensors of interest that may be set to a default mode that corresponds to a higher level of reporting than a default reporting mode of other sensors, or a user may specify one or more sensors to be set to a default mode corresponding to a lower level of reporting). A default mode may be selected based on analytic capabilities of the sensors. For example, a sensor that is configured to perform passive telemetry on data passing through, or generated on, one or more associated devices (e.g., a systems log monitor, a network flow log monitor, etc.) may be assigned to a default mode corresponding to a lower level of reporting than a default mode of a sensor configured to perform some internal analytics and threat detection (e.g., an antimalware program, a signature based packet sniffer, etc.). Also, or alternatively, sensors that primarily handle data of data types unlikely to indicate a security event may be set to a default mode corresponding to a lower level of reporting, whereas sensors of sensor types that handle data of data types likely to indicate a security event may be set to a default mode corresponding to a higher level of reporting. Network sensors (e.g., sensors associated with network devices, which distribute data throughout the network) may be set to a lower default mode than endpoint sensors (e.g., sensors associated with endpoint devices, through which through which data may enter or leave the network), in order to prioritize security event detection based on data from endpoint devices (e.g., endpoint devices may be origin points of more security events than network devices, and/or may have more limited storage capacity than network devices, making detection of data produced by or detected on the endpoint devices more time sensitive). Sensors associated with devices that frequently handle data likely to be exploited or targeted (e.g., sensors associated with domain controllers that respond to authentication request and verify users on a networks, critical data centers or database enclaves of a network) may be assigned a default mode corresponding to a higher level of reporting than devices that handle data unlikely to be exploited (e.g., sensors associated with IoT devices, such as smartTVs, printers, etc.). Sensors may be assigned default modes that indicate instructions to send and/or store data in amounts that are inversely proportional to an amount of data processed by the sensor (e.g., an average historical amount, an expected amount based on associated devices and processing power of the associated devices, etc.), such that a given sensor that processes a large amount of data does not flood the data stream from the sensors.

The sensors may begin handling data of the data types based on the default modes of the sensors and the one or more mode definition tables and/or data level definition tables determined in step 503. For example, as discussed previously with respect to FIG. 3B, based on network conditions for the sensors indicating that the sensors are experiencing high available bandwidth, information indicating mode 2 may be sent to the sensors associated with endpoint devices 341a, 341b, 351a and 351b, and mode 2 may indicate (e.g., according to the mode definition table) instructions configured to cause the sensors to send and/or to store (e.g., locally or on an associated device) data of data types associated with data level 2 and all lower levels (e.g., data indicating module loads, tokens, task creates, logins, process creates and network flows). Alternatively, the instructions may cause the sensors to send and/or store data of data types associated with a single data level, a combination of data levels, or independently of data levels. The instructions may cause the sensors to send and/or store data of the data types at one or more first rates, at one or more first sampling rates and/or in one or more first amounts based on the levels of the sensors and the rates, sampling rates and/or amounts specified in the one or more mode definition tables of the sensors. The instructions may cause the sensors to send a modified or truncated version of data of a data type, (e.g., including only a subset of fields of detected log files as originally produced or detected by a sensor). The sensor may determine instructions, based on a mode of the sensor, to truncate logs of the log type according and report and/or store the truncated version of the log file.

In step 507, the computing device 122 and/or the event analyzer 301 may receive, store and/or process data sent by the sensors. The processing of the data may comprise preprocessing the data. The preprocessing of the data may comprise deduplicating redundant data (e.g., duplicate data associated with one or more sources may be deduplicated and flagged with information specific to the duplicate data, such as identifiers of the one or more sources, time stamps indicating receipt or production time points of the duplicate data, etc.) and/or filtering or flagging the data based on one or more attributes of the data (e.g., a source of the data, a time stamp in the data, a minimum or maximum number of bytes in the data, a data type of the data, etc.). Data received from the sensors may be preprocessed as-received (e.g., in real-time or near real-time), or some or all of the data may be stored and preprocessed at a different time, such as periodically, conditionally (e.g., based on a threshold amount of data received, etc.) or as a processing power (e.g., a processing speed of the event analyzer 301 and/or the computing device 122) allows. Data from the sensors may be received, stored and/or processed according to step 507 continuously throughout the remaining steps of method 500 (e.g., during any of steps 509-561, discussed in the following). Data from the sensors may comprise a request for a mode change. A determination may be made as to whether the request for the mode change can be accommodated. For example, if the sensor having sent the request is not associated with an ongoing security event, the request may be granted. If the sensor is associated with the ongoing security event, the request may be denied.

Step 509 begins a loop performed for each security event type of the one or more security event type definition tables loaded in step 501. In step 509, criteria of the sets of criteria associated with a security event type (e.g., a first security event type from the one or more security event type definition tables) may be compared to the data received from the sensors. The comparison may be performed as data is received (e.g., directly from the sensors or following preprocessing) and/or on stored data, periodically or conditionally. The comparison may be performed preferentially for data of from sensors of interest (e.g., sensors of devices experiencing or involved in ongoing security events, sensors of blacklisted devices, sensors of devices indicated to be of interest based on user input, etc.) For each security event type, criteria of the one or more sets of criteria associated with the security event type may be compared to the preprocessed and/or as-received data. A criterion of a set of criteria may be compared to all of the data and/or to a subset of the data, based on the set of criteria. The subset of data may be based on one or more levels of one or more sensors that sent the subset of data. For example, level-dependent criteria may be compared to a subset of the data comprising data from sensors at a level associated with the level dependent criteria (and/or at a lower level, in the case of cumulative data reporting).

Also, or alternatively, the subset of data may be based on one or more mode histories of the one or more sensors that sent the subset of data. Mode-dependent criteria may be compared to data from a sensor at the relevant mode (or modes) except in a cases that the sensor at the relevant mode (or modes) was assigned to the relevant mode (or modes) from a higher mode within a predefined timeframe (e.g., within the last minute, the last hour, the last day, since data was last received from the sensor, while a security event associated with the sensor is ongoing etc.). For example, based on data received from a sensor at mode 1 satisfying a set of mode 1 criteria (e.g., reporting at least 1000 logins in the example discussed above), the sensor may have its mode adjusted to mode 2. The sensor at mode 2 may report data according to mode 2 that fail to satisfy mode 2 criteria for the security event (e.g., the sensor at mode 2 may report 1000 logins per minute and 20,000 module loads per minute over a same time period) and the security event may be determined to be resolved (e.g., the security event is no longer occurring or the detection based on the mode 1 criteria was a false detection). Based on the security event being determined to be resolved, the sensor may be readjusted to mode 1 and report data at mode 1. The data received from the sensor readjusted to mode 1 may not be compared to the mode 1 criteria for the security event based on the sensor having been at mode 2 within a time period (e.g., within the last minute, within the last day, ever) and having reported data that did not satisfy the mode 2 criteria.

Data determined to satisfy a criterion of a set of criteria associated with one or more potential security event types may be flagged with information indicating a sensor that sent the data (e.g., identifying information of the sensor, a mode of the sensor at the time the data was sent, and/or network conditions associated with the sensor at the time the data was sent, etc.) and/or the potential one or more security event types. Also, or alternatively, data determined to satisfy the criterion may be stored in a separate storage for data associated with potential security events (e.g., of the one or more security event types).

In an example, the sensors associated with the endpoint devices 341a, 341b, 351a and 351b and the network nodes 311a, 311b, 321a and 321b may have been set to a default mode 2. A security event type of potential malware exposure may be stored with an associated criteria of data comprising identifying information of a known exploit server (e.g., a server previously associated with distributing malware; not shown). The associated criteria may apply to data from sensors at all modes. One of the endpoint devices, e.g., endpoint device 341b, may have received a phishing email causing download of malware from the known exploit server. When looping through the security event type of potential malware exposure, data received from the sensors may be searched for the identifying information (e.g., compared to the criteria of data comprising the identifying information).

In step 511, based on the comparison in step 509, it may be determined whether or not a set of criteria associated with the security event type (e.g., indicating a security event of the security event type) is satisfied by a subset of the data received from the sensors. A set of criteria may be determined to be satisfied when each criterion of the set of criteria is satisfied by the data. If no sets of criteria for the security event type are satisfied (511—N), a determination may be made as to whether an security event of the security event type is ongoing (e.g., has been detected previously and has not been resolved or timed-out) in step 515, as will be discussed below. If a set of criteria associated with the current security event type is satisfied (511—Y), a determination may be made as to whether the detected security event is a newly-detected security event, or has been previously detected in step 513. In the example of potential malware exposure above, it may be determined that network flow data (data level 1 data types according to FIG. 3B) received from a sensor associated with network node 311b comprises identifying information of the known exploit server, and thereby satisfies the set of criteria associated with the security event type.

In step 513, a determination may be made as to whether the detected security event is a newly-detected security event of the security event type, or has been previously detected. A table storing information about existing security events of the security event types may be maintained by the computing device 122 and updated based on detection of new security events or received data indicating changes in existing security events. The existing security event table may comprise an entry for each detected security event that comprises information indicating the security event type, the set of criteria that were satisfied to detect the security event, the subset of data that satisfied criteria, proximities identified for the security event, sensors associated with the proximities (proximity sensors), original (pre-security event) modes of the proximity sensors, mode adjustments of proximity sensors in response to and/or after the security event, and/or data received based on mode adjustments of the proximity sensors. The existing security event table may be checked for any existing security events of the security event type. Based on a determination that the security event table does not include any entries for existing security events of the security event type, a determination may be made that the detected security event is a new security event of the security event type (513—Y). Based on a determination that the existing security event table includes at least one entry for existing security events of the security event type in the existing security event table, the subset of the data that satisfied the criteria indicating the detected security event may be compared to information stored in the at least one entry. Based on the comparison indicating that subset of data is inconsistent with the information in the entry in the existing security event table (e.g., the data may be sent from different sensors than indicated by the information, associated with different devices than indicated by the information, of different data types than indicated by the information and/or indicating different time points than indicated by the information), a determination may be made that the detected security event is a new security event of the security event type (513—Y). Based on the comparison indicating that the subset of data is consistent with the information in the entry in the existing security event table, a determination may be made that the detected security event has been already detected and is an existing security event (513—N). The subset of data, or information indicating the subset of data (e.g., sensors associated with the data, devices associated with the sensors, data types of the data, time points indicated in the data, etc.), may be flagged as being associated with the ongoing security event and/or stored with data associated with ongoing security events. For each new security event detected (509—Y), the method may proceed to step to step 551 in FIG. 5B.

Based on the determination that the detected security event is a new security event (513—Y), a new entry may be added to the existing security event table indicating the new security event in step 551. The subset of data that satisfied the criteria indicating the security event, or information associated with the subset of data (e.g., sensors associated with the subset of data, devices associated with the sensors, data types of the subset of data, time points indicated in the subset of data, etc.), may be flagged as being associated with a new ongoing security event and/or stored in the new entry in the existing security event table indicating the newly detected security event. In the potential malware exposure example, an entry of potential malware exposure may be added as a new entry in the existing security event table, along with the network flow data that comprised the information identifying the known exploit server and/or additional information, such as a time point that the network flow data was received and/or created, and/or information of the network flow data indicating that it originated at the endpoint device 341b.

In step 553, based on the detected security event, determined to be a new security event in step 513, rules for selecting sensors for adjusting data collection associated with the security event type of the new security event may be selected from the rules for adjusting data collection based on detection of security events (e.g., as received or generated and stored in the security event definition table in step 503, and for the set of criteria satisfied by the subset of data to detect the new security event in step 511). As described previously, the rules may comprise rules for selecting one or more sensors for mode adjustment and/or data level definition adjustment based on one or more proximities of the one or more sensors to the security event. The one or more proximities (e.g., proximities 401, 403 and/or 405 in FIG. 4A) may be determined based on the rules for determining the proximities and the data that satisfied the set of criteria indicating the security event, as described with respect to step 503. For example, in FIG. 4A, sensor data that satisfied the set of criteria for a suspicious file download may have been received from the sensor for endpoint device 341b while it was at mode 2. Rules for selecting sensors for mode adjustment based on detection of a suspicious file download may be identified from the rules for adjusting data collection and may comprise rules to select sensors based on proximities 1-3 (401-405) of FIG. 4A, with proximity 1 (401) indicating the sensors for endpoint devices 341b and 351a, proximity 2 (403) indicating the sensor for endpoint device 341a, and proximity 3 (405) indicating the sensor for endpoint device 351b.

In the potential malware exposure example, the rules for selecting sensors for level adjustment may comprise rules to identify any devices that may have received data from the known exploit server based on the data that satisfied the criteria indicating the potential malware exposure (e.g., based on the netflow data comprising the identifying information). The rules may include a rule to increase a mode of a sensor associated with a device indicated to have received data from the known exploit server (e.g., within a first proximity of a device determined to have received data from the known exploit server) to an elevated mode, e.g., to a mode 4, indicating instructions to send and/or store data types assigned to data level 4. The rules may also include a rule to adjust a data level definition table of sensors associated with network devices within a network link of any sensors within the first proximity (second proximity). The rule may specify that the data level definition table be adjusted to include connection logs, of the device in the first proximity, that occurred during a time window before and/or after a time point at which the potential malware exposure occurred (e.g., 30 minutes before to 1 day after).

In step 555, according to the rules for selecting sensors for adjusting data collection determined in step 553, a determination may be made as to whether modes should be changed for one or more sensors. One or more sensors may be selected and determined to require a mode change based on the one or more sensors being within one of the one or more proximities, based on a current mode of the one or more sensors and/or based on the rules for adjusting data collection for security events of the security event type. Each of the one or more proximities determined in step 553 may be checked to determine any sensors therein. If no sensors are determined to be in the one or more proximities, a determination may be made not to change sensor modes based on the detected security event (555—N). Information indicating the one or more proximities may be stored with information indicating no associated sensors were found in the entry for the detected security event in the existing security event table. A check for any existing security events of the security event type in the existing security event table may be performed according to step 511 (to be discussed below). If one or more sensors are determined to be within the one or more proximities, the one or more sensors may be selected for potential mode adjustment and/or data level definition adjustment. Current modes and/or data level definitions of the one or more selected sensors may be determined and compared to the rules for mode adjustment and/or data level definition adjustment. If the comparison between a current mode and/or data level definitions for a sensor and the rules for mode adjustment and/or data level definition adjustment associated with a proximity of the selected sensor indicate that the sensor is already reporting data of a data type required, is already reporting data according to a mode specified in the rules and/or has had its mode adjusted to increase reporting by at least an amount specified in the rules since a time point associated with the security event, no mode definition adjustment or mode adjustment may be necessary for the sensor. Alternatively, the comparison between the current modes and/or mode definitions for one or more sensors and the rules indicate that a mode of the one or more sensors and/or data level definitions for the one or more sensors should be adjusted, a determination may be made that a mode and/or data level definitions for the one or more sensors need to be changed (555—Y).

In the potential malware exposure example, the sensor associated with the endpoint device 341b may be selected for potential mode adjustment. It may be determined that the mode of the sensor associated with the endpoint device 341b is at level 2, and that the level should therefore be changed to mode 4. Additionally, the sensors associated with network nodes 311 a and 311b may be selected for data level definition adjustment to adjust its stored data level definitions table to include connection logs of the sensor associated with the endpoint device 341b.

In step 557, based on the determination that a mode and/or data level definitions for the one or more sensors need to be changed in step 555, mode adjustments and/or data level definition adjustments may be made the one or more sensors. The mode and/or data level definitions may be adjusted according to the rules for adjusting data collection for the security event type. One or more messages may be sent to the one or more sensor to cause them to report and/or store data according to the adjusted mode and/or adjusted data level definitions. In the potential malware exposure example, a first message may be sent to the sensor associated with the endpoint device 341b to increase to mode 4. A second message may be sent to the sensor associated with network node 311b, the second message including an adjusted data level definition table or instructions to temporarily adjust a stored data level definition table to include connection logs in for the sensor associated with the endpoint device 341b to report any stored or detected connection logs from the time window indicated by the rules (e.g., 30 minutes before a time at which the network flow data was received to one day after). Additionally, the mode adjustment may be documented by adding information indicating the mode adjustment history or mode history to, for example, the existing security event table and/or in an entry for the sensor whose mode was adjusted in the table comprising the list of the sensors and/or the associated devices received in step 501.

In another example, a potential denial of service security event type may be associated with a set of criteria of at least 5 responses from a server to a connection request to the server indicating services are unavailable (e.g., a 503 Service Unavailable server error response code) over a time frame (e.g., a minute). Data received from the sensors may comprise data indicating 5 HTTP session logs comprising a same requested resource and a status code indicating a failure of the HTTP request. Rules may be stored for the set of criteria comprising rules for selecting sensors for potential mode adjustment and/or data level definition adjustment based on a first proximity comprising a server associated with the requested resource, a second proximity comprising devices within one network link of the server, a third proximity comprising devices sharing a connection with the server within a time window around time stamps of the detected HTTP (e.g., 1 minute before the earliest time stamp until one minute after the latest time stamp) and a fourth proximity comprising devices two or more network links from the server. A sensor may be selected based on data received from the sensors indicating an association with the sensor and a device in the first, second, third and/or fourth proximities. For example, the information indicating the sensors and the associated devices received in step 501 may comprise information indicating a sensor associated with the server. The sensor associated with the server may be selected for potential mode adjustment and/or data level definition adjustment based on the rules for the set of criteria and the first proximity. A sensor associated with the third proximity may be determined based on a search of data received from the sensors (e.g., stored by the computing device 122) for connection logs or other data indicating a connection with the server. Also, or alternatively, a request for connection logs within the time window may be sent to sensors on the network, and data received in response to the request may be searched to determine any devices connected to the server during the time window. Based on any devices determined to be in the third proximity, any sensors associated with the devices may be selected for potential mode adjustment and/or data level definition adjustment based on the ruled for the set of criteria and the second proximity. Similar detection may be performed for sensors associated with the second and fourth proximities. Based on no data received by the sensors indicating a sensor within the first, second or third proximities, no sensors may be selected for mode adjustment and/or data level definition adjustment for those proximities.

Based on a sensor being selected for the first proximity, the mode of the sensor and/or data level definitions for the sensor may be compared to the rules for mode adjustment and/or data level definition adjustment based on the first proximity for the set of criteria. The rules may indicate that a sensor in the first proximity should be set to a high reporting mode (e.g., mode 5, which may indicate instructions for sending and/or storing data from data levels 1-5), based on the large range of potential causes for a server to be unable to provide a requested service (e.g., based on the set of criteria indicating a range of potential security event types). The rules may indicate that the mode should be applied retroactively to include the time window (e.g., any data stored at the sensor and/or the server that would have been reported at mode 5 during the time frame should be reported) and continue until the security event is resolved. Based on the comparison indicating that the sensor associated with the server was at a mode 5 throughout the time window and is at a mode 5 now, no mode adjustment may be made. Based on the comparison indicating that the sensor associated with the server is currently at a mode 5, but was not at a mode 5 during the time window, instructions may be sent to report data stored at the sensor and/or server according to mode 5 data reporting. The rules may indicate that a sensor associated with the second proximity should be set to an elevated reporting mode (e.g., mode 4, which may indicate instructions for sending and/or storing data from data levels 1-4), based on the large range of potential causes for a server to be unable to provide a requested service and a low probability that data of data types assigned to data level 5, from sensors in the second proximity, may be relevant to supplemental sets of criteria associated with the security event type (e.g., supplemental sets of criteria indicating a severity of the security event, a certainty of the security event, a resolution of the security event, etc.). The rules may indicate that a sensor associated with the third proximity should be set to a slightly elevated reporting mode (e.g., mode 3, which may indicate instructions for sending and/or storing data from data levels 1-3) and that the data level definitions should be adjusted for connection logs to be reassigned to data level 3 from an current assignment to data level 5 (see, e.g., FIG. 4B). The rules may specify setting sensors associated with the third proximity to the elevated reporting mode based on a range of potential causes for devices to receive a failure to receive services messages, a high probability that connection logs of third proximity sensors may be relevant to supplemental sets of criteria associated with the potential security event and a low probability that data of data types assigned to data level 4 and of other data types assigned to data level 5, from sensors in the third proximity, may be relevant to supplemental sets of criteria associated with the potential security event. The rules may indicate that the mode and adjusted data level definition should be applied retroactively to include the time window and after the time window (e.g., applied retroactively and until the security event is resolved), as described above. Modes of sensors associated with the third proximity may be compared to mode 3 and adjusted as described above, if necessary. Similarly, the rules may indicate that sensors determined to be associated with the fourth proximity should report requests to the server for the resource during the time window. Data level definitions may be adjusted for sensors associated with the fourth proximity by assigning data indicating requests to the server for the resource to data level 1 during the time frame. Instructions may be sent to the one or more sensors associated with the proximities to send and/or store data according to the adjusted modes of the sensors and/or data level definitions.

In step 515, based on no sets of criteria indicating the security event type being satisfied (511—N) or based on a new security event being determined (513—Y) and any mode adjustments and/or data level definition adjustments having been made in accordance with the rules for mode adjustment and/or data level definition adjustment (step 555—N or following step 557), the existing security event table may be checked for any existing security events of the security event type. If it is determined that there are no existing security events of the security event type (515—N), a determination may be made as to whether there is a next security event type in the one or more security event type definition tables in step 517, as will be discussed later. Based on a determination that there are one or more existing security events of the security event type indicated in the existing security event table (511—Y), the method may continue to step 559.

In step 559, for each existing security event of the security event type determined in step 511 (511—Y), a determination may be made as to whether data received from the sensors indicates a change in the security event. Criteria of the supplemental sets of criteria associated with the security event type may be compared to data received from the sensors in step 507. Also, or alternatively, the criteria of the supplemental sets of criteria may be compared to a subset of the data received from the sensors, such as data received from one or more sensors that had mode adjustments and/or data level definition adjustments in response to the existing security event. The data received from the one or more sensors that had mode adjustments in response to the existing security event (e.g., based on being within a proximity of the security event) may be tagged or otherwise indicated to be associated with the security event (e.g., stored in an entry for the security event in the existing security event table). The data received from the one or more sensors, and/or the total data received from the sensors, may be determined to indicate a change in the security event based on satisfying a supplemental set of criteria. A change in the security event may comprise an increase or decrease in severity of the security event, a confirmation of a security event type of the security event, an indication that the security event is of a different security event type and/or an indication that a security event is resolved. Additionally, the data may be searched for an indication of sensors associated with the one or more proximities associated with the security event. Based on the data indicating a sensor within the one or more proximities, the information in the existing security event table may be searched to determine whether the sensor was previously determined to be within the proximity. If the sensor was not previously determined to be within the proximity, it may be determined that the sensor is a newly identified sensor associated with the one or more proximities. A change in the security event may comprise newly identified sensors associated with the one or more proximities of the security event. The security event may be determined to be resolved, have been falsely detected, and/or timed-out (e.g., according to data stored in the existing security event table indication a time of detection or origin of the security even and/or a time-out rule stored in an entry for the security event type in the security event type definition table). A change in the security event may comprise an expiration of a security event due to time, an indication that a security event is resolved or no longer poses a security threat.

In the potential malware exposure example, in a subsequent loop through the security event types of the security event table, because the previously detected potential malware exposure event is indicated in the previously created entry in the existing security event table, a determination may be made as to whether data received from the sensors associated with the endpoint device 341*b* and the network nodes 311*a*-*b* indicate a change in the potential malware exposure. The entry may include information about what mode adjustments were implemented for the identified sensors. Additional data received from the sensor associated with the endpoint device 341*b* may include mode 3 data of registry writes indicating that malware may have achieved persistence on the endpoint device 341*b* (559—Y).

Based on a change in the security event being detected (559—Y), a determination may be made as to whether modes and/or data level definitions of sensors associated with the one or more proximities of the existing security event should be adjusted and/or readjusted in step 561. Based on the change in the security event indicating a decrease in severity of the security event and/or a resolution of the security event, and based on a determination that a sensor for which a mode and/or data level definition was adjusted previously in response to the security event is not associated with another security event, the previously adjusted modes and/or data level definitions of the sensor may be readjusted to (or towards) an original or default mode and/or original or default data level definitions. Based on a change in the security event increasing an increase in severity of the security event, the adjusted mode and/or data level definitions may be maintained and/or further adjusted. The rules for adjusting data collection stored in the security event definition table may include rules for a set of secondary criteria associated with the security event type, wherein the secondary criteria may be satisfied by data received following any mode adjustment or data level definition adjustment in response to a detected security event. In the potential malware exposure example, the registry writes reported by the sensor associated with the endpoint device 341*b* may satisfy a set of secondary criteria indicating that malware exposure is confirmed. The rules for the set of secondary criteria may include a rule that the sensor associated with the endpoint device 341*b* should be maintained at mode 4 (e.g., a timeout of the mode change may be ignored), and/or a rule to identify other endpoint devices within a same organization network of the endpoint device 341*b* and raise a mode of the other endpoint devices to at least a mode 3.

For a sensor associated with multiple security events, mode and/or data level definition adjustments may be made or maintained based on the highest adjusted mode and/or data level definitions resulting in the most data being sent and/or stored. Newly identified sensors associated with the one or more proximities for the security event may be selected for mode and/or data level definition adjustment as in step 553. Based on a determination that modes and/or data level definitions should be adjusted or readjusted for sensors associated with the proximities of the security event (561—Y), the modes and/or data level definitions may be adjusted and/or readjusted and instructions to report and/or store data according to the adjusted and/or readjusted modes and data level definitions may be sent in step 563. If data level definitions were adjusted or readjusted, the instructions may comprise the adjusted or readjusted data level definitions. If a mode was adjusted and/or readjusted for a sensor, the instructions may comprise instructions to report and/or store data at the adjusted or readjusted mode, referencing mode definitions and/or data level definitions stored by, or accessible to, the sensor. Also, or alternatively, the instructions may comprise instructions to adjust or readjust a mode stored by the sensor by an amount determined according to the rules for adjusting data collection for the security event type. For example, in a case that the modes are ordered based on a level of reporting associated with the modes, the rules for adjusting data collection may indicate that the sensor should adjust a current mode to a next (higher level) mode in the order. Also, or alternatively, the rules for adjusting data collection may indicate that the sensor should report data of data types assigned to a certain data level. The instructions may comprise instructions to apply the adjusted mode and/or data level definitions retroactively, and/or for a window around a time point associated with the security event, as in step 557, for example. Based on a determination in step 559 that the security event has been resolved, was falsely detected, and/or has timed-out (e.g., according to data stored in the existing security event table and/or the security event type definition table), the entry corresponding to the security event may be purged from the existing security event table and/or data collected in response to detection of the security event may be purged from the data stored by the computing device 122. If the change in the security event is determined to not require a change in mode and/or data level definitions for the sensors associated with the proximities of the security event, and/or if a change in the modes and/or data level definitions associated with the change in the security event is superseded by mode and/or data level definition requirements associated with another existing security event, the modes and/or data level definitions may be maintained (561—N).

In step 565, for each existing security event of the security event type, if received data indicates a change in the existing security event and/or any mode or data level definition adjustments or readjustments, the entry for the existing security event may be updated to indicate the data, the change in the existing security event and/or any mode or data level definition adjustments or readjustments performed, as well as time points for the change in the existing security event (e.g., when the change was detected, when the data indicating the change was received and/or generated) and the adjustments and/or readjustments.

In step 517, a determination may be made as to whether there is a next security event type in the security event type definition table to be checked in the current loop through the security event types. Based on the determination indicating that there is still a security event type to be checked (517—Y), criteria of one or more sets of criteria associated with a next security event type may be compared to the data received from the sensors according to step 509. Based on the determination indicating that there is not a security event type to be checked in the current loop through the security event types (517—N), network conditions may be determined and updated for the sensors in step 519.

In step 519, network conditions may be checked for the sensors and/or the associated devices according to the rules for monitoring network conditions received and/or loaded in step 501. Network conditions for the sensors and/or the associated devices may be monitored according to the rules throughout any of the previous steps.

In step 521, a determination may be made as to whether the network conditions have changed sufficiently and/or other data received from the sensors satisfy criteria indicating a network event. Based on a comparison between the network conditions determined in step 519 and previous network conditions, a change in network conditions for one or more sensors satisfying a criteria indicated in the rules for monitoring the network conditions may be determined. Also, or alternatively, one or more other criteria indicated in the rules for monitoring the network conditions may be satisfied based on a comparison of the criteria and data reported by the sensors, such as receipt of at least a threshold number of requests to change a mode from the one or more sensors. Based on a criteria indicated in the rules of monitoring the network conditions being satisfied, a determination may be made that a network event warranting a change in data level definitions for the one or more sensors has occurred (521—Y). Based on no criteria indicated in the rules for monitoring the network conditions being satisfied, data may continue to be received, preprocessed, stored and compared to criteria according to 507 (521—N).

In step 523, based on a network event being detected, one or more sensors affected by the network event may be determined and data level definitions and/or modes may be adjusted for one or more of the affected one or more sensors. For a network event detected based on a change in network conditions for one or more sensors satisfying a threshold, data level definitions may be redetermined by reassigning the data types to the data levels based on the new network conditions, as in step 503. For a network event detected based on a request for a mode change, the mode change may be granted and/or an available bandwidth for the requesting sensor and/or an associated device may be determined (e.g., based on a response to a query to the sensor for an available bandwidth) and data level definitions may be redetermined based on the available bandwidth. Sensors associated with a proximity of an ongoing security event may not be selected for mode and/or data level definition adjustment. Also, or alternatively, sensors associated with a proximity of an ongoing security event may be selected for mode and/or data level definition adjustment as above, but modified to satisfy the rules for mode adjustment and/or data level definition adjustment based on the security event type of the ongoing security event. For example, a sensor associated with an ongoing security event may have had a data level definition adjustment in which connection logs were reassigned to level 1. Based on a network event being detected and the network event being determined to affect the sensor, data level definitions may be redetermined for the sensor based on the network conditions and with connection logs remaining assigned to data level 1. Based on adjusted data level definitions and/or modes determined in step 523, data may continue to be received, preprocessed and stored from the sensors according to step 507.

Figure 6:
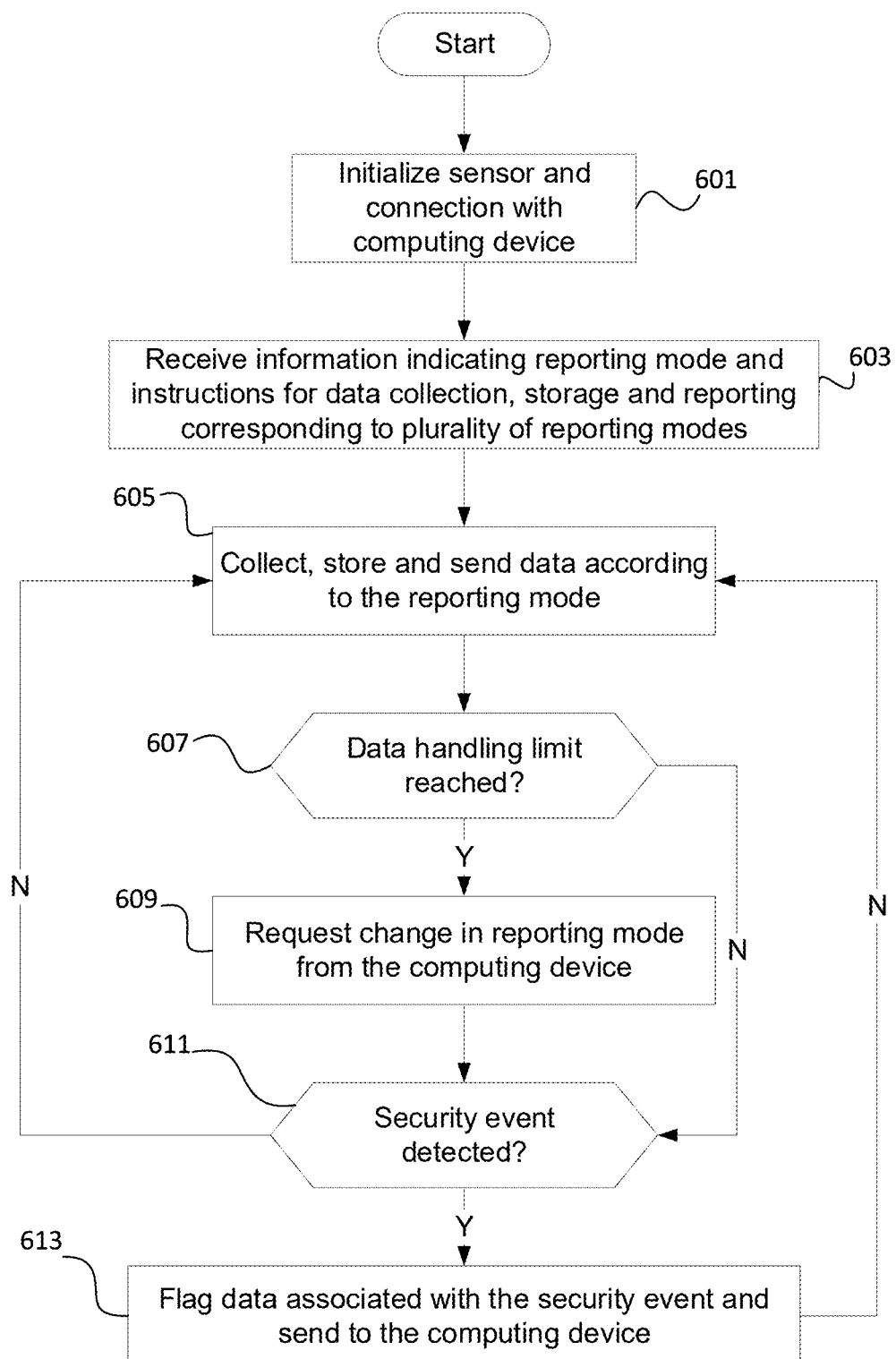
FIG. 6 is a flow chart showing an example method for data collection management.

FIG. 6 shows a method for data collection management 600 that may be performed by a sensor on a network. In step 601, the sensor may turn on and connect to one or more devices. The sensor may determine (e.g., based on connecting to the one or more devices), and/or receive (e.g., from the one or more devices) information indicating, one or more data types that it can detect, store and/or report. The one or more data types may be one or more data types produced by the one or more devices, received by the one or more devices, and/or otherwise detected based on a connection with the one or more devices. The one or more data types may additionally, or alternatively, comprise one or more data types produced by the sensor based on data associated with the one or more devices. The sensor may be capable of producing data by processing data associated with (e.g., received from, detected on, etc.) the one or more devices. For example, the sensor may be capable of producing data, of one or more data types by on collecting, filtering, summarizing, truncating, annotating, combining and/or evaluating data of the one or more devices. The sensor may receive a connection request and/or a request for information (e.g., from the computing device 122). The requested information may comprise identifying information of the sensor and/or the one or more associated devices (e.g., IP addresses, device types, network addresses), storage space available at the sensor and/or the one or more associated devices (e.g., available space in a memory, buffer, cache), local network conditions of the sensor and/or associated devices (e.g., available bandwidth, detected download or upload speeds, latency, etc.), and/or the one or more data types detected and/or produced by the sensor. The sensor may reply to the request with the requested information and/or a portion thereof. The sensor may receive and/or load mode definition tables and/or data level definition tables (e.g., comprising information similar to tables shown in FIGS. 3B and 4B) and one or more sensor-specific security event type definition tables. The sensor may receive, with the one or more sensor-specific security event definition tables, instructions to compare criteria in the one or more sensor-specific security event type definition tables to data received and/or detected by the sensor. The one or more sensor-specific security event type definition tables may comprise security event types and associated sets of criteria that are capable of being detected based on data types associated with the sensor (e.g., the security event type definition table be based on the one or more security event type definition tables discussed with respect to step 501 in the method 500, but only including security event types and associated sets of criteria that the sensor is capable of satisfying on its own).

In step 603, instructions for collecting, storing and reporting data produced on or flowing through the sensor and/or the one or more associated devices may be determined. The instructions may be determined using information indicating a mode and the mode definition table comprising a plurality of sets of instructions corresponding to a plurality of modes comprising the mode. Based on the information indicating the mode, a set of instructions may be determined from the plurality of sets of instructions. The information indicating the mode, the instructions and/or the plurality of sets of instructions corresponding to the plurality of modes may be stored (e.g., in a memory of the sensor). At any time, information indicating a new mode may be received, or instructions to adjust a stored mode may be received. The stored mode may be replaced with the new mode. Also, or alternatively, the modes may be adjusted by an amount (e.g. indicated in the instructions to adjust the stored mode. A set of instructions from the plurality of sets of instructions may be determined based on the new mode and/or the adjusted stored mode. Based on determining that no sets of instructions correspond to the new mode or the adjusted mode, a request for instructions for sending and/or storing data according to the new mode or according to the adjusted mode may be sent. Also, or alternatively, in a case that the modes correspond to different levels of data reporting, a set of instructions may be determined, from the plurality of sets of instructions, that correspond to a closest level of reporting to the new or adjusted mode.

In step 605, data may be collected, stored and sent according to the instructions determined in step 603. Data may be collected, stored and sent according to the instructions to the extent possible based on limitations in storage, processing and network capacity at the sensor and/or the one or more associated devices.

In step 607, the sensor may determine whether a data handling limit is reached (e.g., whether storage is full, network bandwidth is limited, network latency limits reporting data, etc.) and whether one or more of the instructions cannot be followed, or will not be able to be followed (e.g., if storage remains full, network bandwidth remains as is or decreases, network latency remains as is or worsens). Based on determining that one or more of the instructions cannot be followed, or will not be able to be followed (607—Y), the sensor may send a request to adjust the mode from the computing device 122 in step 609. Alternatively, the sensor may determine that the instructions have been followed (or are being followed) without reaching or approaching a data handling limit (e.g., storage exceeds storage requirements of the instructions, network bandwidth exceeds data reporting requirements of the instructions, network latency does not limit required timing of reporting according to the instructions, etc.). Based on the determination that the instructions have been followed, the sensor may determine that no data handling limit has been reached.

In step 611, based on a request to adjust the mode being sent or a determination that no data handling limit was reached (607—N), the sensor may determine whether or not a potential security event is detected in data received, detected, and/or stored by the sensor. The sensor may be configured to analyze data to determine security events. The sensor may be configured to analyze data collected at the sensor or passing through the sensor for potential security events. The sensor may analyze data according to its own internal analytics (e.g., in the case of an antimalware program, a signature based network packet sniffer, etc.), and/or according to the one or more security event definition tables received with the instructions sent in step 603. The sensor may determine, based on its own analytics and/or based on a comparison of a set of criteria of the security event type definition table with data received, stored and/or produced by the sensor, that data indicates a potential security event in step 611 (611—Y). The sensor may flag the data indicating the potential security event and send the data and/or information with the flag to the computing device 122 in step 613. The flag may be identifiable (e.g., by the computing device 122 and/or the event analyzer 301) as indicating a potential security event and may cause the data and/or the information to be processed with higher priority (e.g., processed before, faster than, etc.) other data (e.g., other data sent from the sensor and/or other sensors). The sensor may then continue to collect, store and send data according to step 605. In a case that the sensor is not configured to analyze data for potential security events and/or does not detect a security event, the sensor may continue to collect, store and/or send data according to step 605.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   sending, by a computing device and to at least one sensor of a plurality of sensors, information indicating a first mode, of a plurality of modes, indicating one or more first amounts of data, of one or more data types, to report;
   receiving, from the plurality of sensors, initial data comprising first data received, from the at least one sensor, according to the first mode;
   determining, based on the initial data, a security event associated with the at least one sensor;
   sending, based on the security event and to the at least one sensor, information indicating a second mode indicating one or more second amounts of data, of the one or more data types, to report;
   receiving, from the at least one sensor, second data according to the second mode;
   sending one or more instructions, based on the security event and to the at least one sensor, that cause the at least one sensor to:
      determine a difference between past sensor data, reported according to the first mode and within a past time frame, and stored sensor data, received within the past time frame and associated with the second mode; and
      report the difference between the past sensor data reported according to the first mode and the stored sensor data associated with the second mode.

2. The method of claim 1, further comprising:
selecting the at least one sensor based on a proximity of the at least one sensor to the security event.

3. The method of claim 1, wherein the sending the information indicating the second mode is based on a first proximity of the at least one sensor to the security event, the method further comprising:
sending, to at least one second sensor of the plurality of sensors and based on a second proximity of the at least one second sensor to the security event, information indicating a third mode indicating one or more third amounts of data, of the one or more data types, to report,
wherein the information indicating the second mode and the information indicating the third mode are configured to cause the at least one sensor to send data at a different rate than the at least one second sensor.

4. The method of claim 1, wherein the sending the information indicating the second mode comprises sending, based on the security event and to different subsets of the plurality of sensors, information indicating different modes, of the plurality of modes, indicating different amounts of data, of the one or more data types, to report, and wherein the sending the information indicating the different modes is based on one or more of:
a proximity, of sensors in the different subsets, to the security event;
a time stamp in data received via the sensors in the different subsets; or
network conditions associated with the sensors in the different subsets.

5. The method of claim 1, further comprising:
receiving information indicating one or more of:
one or more amounts of data associated with the one or more data types; or
one or more associations of the one or more data types with one or more security event types,
wherein the plurality of modes indicate instructions to report or store data of the one or more data types in amounts based on the received information.

6. The method of claim 1, further comprising:
receiving information indicating the one or more data types associated with the plurality of sensors and one or more amounts of data associated with the one or more data types; and
assigning, based on a comparison of the one or more amounts of data and one or more network bandwidths associated with the plurality of sensors, the one or more data types to a plurality of reporting modes, comprising the first mode, that each correspond to different instructions indicating amounts of data to report; and
wherein the sending the information indicating the first mode comprises sending, to the plurality of sensors, information indicating one or more of the plurality of modes.

7. A method comprising:
receiving, by a computing device, information indicating a plurality of sensors and data types associated with the plurality of sensors;
generating, based on amounts of data of the data types and one or more data patterns associated with one or more security events, a plurality of instructions to report data of the data types in different amounts;
storing, for each sensor of the plurality of sensors, a first mode corresponding to a subset of the plurality of instructions;
sending, to each of the plurality of sensors, a message indicating the first mode stored for the sensor and the plurality of instructions, wherein the message causes the sensor to select a subset, of the plurality of instructions, corresponding to the first mode; and
receiving, from the plurality of sensors and according to the first modes stored for the plurality of sensors, data of the data types;
sending one or more instructions, based on the received data of the data types and to the plurality of sensors, that cause the plurality of sensors to:
determine a difference between past sensor data, reported according to the first mode and within a past time frame, and stored sensor data, received within the past time frame and associated with a second mode; and
report the difference between the past sensor data reported according to the first mode and the stored sensor data associated with the second mode.

8. The method of claim 7, further comprising:
comparing the received data to one or more criteria for detecting a security event of a security event type;
based on a subset of the received data satisfying the one or more criteria, detecting a security event associated with a time point;
sending, to one or more sensors, of the plurality of sensors, associated with the subset of the received data, a message indicating one or more adjusted modes; and
receiving, from the one or more sensors, data of the data types in adjusted amounts based on one or more subsets, of the plurality of instructions, corresponding to the one or more adjusted modes.

9. The method of claim 7, wherein the one or more data patterns associated with the one or more security events indicate probabilities that receiving data, of the data types, indicates a future security event, and
wherein the generating the plurality of instructions comprises generating instructions to report data, of the data types, in amounts based on the probabilities.

10. The method of claim 7, wherein the generating the plurality of instructions is further based on a comparison between the amounts of data of the data types and a plurality of potential network conditions, and wherein the stored modes correspond to different subsets, of the plurality of instructions, associated with different potential network conditions of the plurality of potential network conditions, the method further comprising:
determining a change in network conditions, for a subset of sensors of the plurality of sensors, by at least a threshold amount; and
sending, to each sensor of the subset of sensors, a second message configured to cause the sensor to select a different subset, of the plurality of instructions, based on the change in network conditions.

11. An apparatus comprising:
at least one processor; and
memory storing instructions that, when executed by the at least one processor, configure the apparatus to:
send, to at least one sensor of a plurality of sensors, information indicating a first mode, of a plurality of modes, indicating one or more first amounts of data, of one or more data types, to report;
receive, from the plurality of sensors, initial data comprising first data received, from the at least one sensor, according to the first mode;
determine, based on the initial data, a security event associated with the at least one sensor;

send, based on the security event and to the at least one sensor, information indicating a second mode indicating one or more second amounts of data, of the one or more data types, to report; and receive, from the at least one sensor, second data according to the second mode;

send one or more instructions, based on the security event and to the at least one sensor, that cause the at least one sensor to:

determine a difference between past sensor data, reported according to the first mode and within a past time frame, and stored sensor data, received within the past time frame and associated with the second mode; and report the difference between the past sensor data reported according to the first mode and the stored sensor data associated with the second mode.

12. The apparatus of claim 11, wherein the instructions, when executed by the at least one processor, further configure the apparatus to:

select the at least one sensor based on a proximity of the at least one sensor to the security event.

13. The apparatus of claim 11, wherein the instructions, when executed by the at least one processor, configure the apparatus to:

send the information indicating the second mode based on a first proximity of the at least one sensor to the security event, and further configure the at least one processor to:

send, to at least one second sensor of the plurality of sensors and based on a second proximity of the at least one second sensor to the security event, information indicating a third mode indicating one or more third amounts of data, of the one or more data types, to report, wherein the information indicating the second mode and the information indicating the third mode are configured to cause the at least one sensor to send data at a different rate than the at least one second sensor.

14. The apparatus of claim 11, wherein instructions, when executed by the at least one processor, configure the apparatus to send the information indicating the second mode by sending, based on the security event and to different subsets of the plurality of sensors, information indicating different modes, of the plurality of modes, indicating different amounts of data, of the one or more data types, to report, and wherein the sending the information indicating the different modes is based on one or more of:

a proximity, of sensors in the different subsets, to the security event;

a time stamp in data received via the sensors in the different subsets; or network conditions associated with the sensors in the different subsets.

15. The apparatus of claim 11, wherein the instructions, when executed by the at least one processor, further configure the apparatus to:

receive information indicating one or more of:
one or more amounts of data associated with the one or more data types; or
one or more associations of the one or more data types with one or more security event types, wherein the plurality of modes indicate instructions to report or store data of the one or more data types in amounts based on the received information.

16. The apparatus of claim 11, wherein the instructions, when executed by the at least one processor, further configure the apparatus to:

receive information indicating the one or more data types associated with the plurality of sensors and one or more amounts of data associated with the one or more data types; and assign, based on a comparison of the one or more amounts of data and one or more network bandwidths associated with the plurality of sensors, the one or more data types to a plurality of reporting modes, comprising the first mode, that each correspond to different instructions indicating amounts of data to report; and wherein the sending the information indicating the first mode comprises sending, to the plurality of sensors, information indicating one or more of the plurality of modes.

17. A non-transitory computer-readable medium storing instructions that, when executed, cause:

sending, by a computing device and to at least one sensor of a plurality of sensors, information indicating a first mode, of a plurality of modes, indicating one or more first amounts of data, of one or more data types, to report;

receiving, from the plurality of sensors, initial data comprising first data received, from the at least one sensor, according to the first mode;

determining, based on the initial data, a security event associated with the at least one sensor;

sending, based on the security event and to the at least one sensor, information indicating a second mode indicating one or more second amounts of data, of the one or more data types, to report; and receiving, from the at least one sensor, second data according to the second mode;

sending one or more instruction, based on the security event and to the at least one sensor, that causes the at least one sensor to:

determine a difference between past sensor data, reported according to the first mode and within a past time frame, and stored sensor data, received within the past time frame and associated with the second mode; and report the difference between the past sensor data reported according to the first mode and the stored sensor data associated with the second mode.

18. The non-transitory computer-readable medium of claim 17, wherein the instructions, when executed, further cause:

selecting the at least one sensor based on a proximity of the at least one sensor to the security event.

19. The non-transitory computer-readable medium of claim 17, wherein the instructions, when executed, cause the sending the information indicating the second mode based on a first proximity of the at least one sensor to the security event, and wherein the instructions, when executed, further cause:

sending, to at least one second sensor of the plurality of sensors and based on a second proximity of the at least one second sensor to the security event, information indicating a third mode indicating one or more third amounts of data, of the one or more data types, to report, wherein the information indicating the second mode and the information indicating the third mode are configured to cause the at least one sensor to send data at a different rate than the at least one second sensor.

20. The non-transitory computer-readable medium of claim 17, wherein the instructions, when executed, cause sending the information indicating the second mode by sending, based on based on the security event and to different subsets of the plurality of sensors, information indicating different modes, of the plurality of modes, indicating different amounts of data, of the one or more data types, to report, and wherein the sending the information indicating the different modes is based on one or more of:
  a proximity, of sensors in the different subsets, to the security event;
  a time stamp in data received via the sensors in the different subsets; or
  network conditions associated with the sensors in the different subsets.

21. The non-transitory computer-readable medium of claim 17, wherein the instructions, when executed, further cause:
  receiving information indicating one or more of:
    one or more amounts of data associated with the one or more data types; or
    one or more associations of the one or more data types with one or more security event types,
  wherein the plurality of modes indicate instructions to report or store data of the one or more data types in amounts based on the received information.

22. The non-transitory computer-readable medium of claim 17, wherein the instructions, when executed, further cause:
  receiving information indicating the one or more data types associated with the plurality of sensors and one or more amounts of data associated with the one or more data types; and
  assigning, based on a comparison of the one or more amounts of data and one or more network bandwidths associated with the plurality of sensors, the one or more data types to a plurality of reporting modes, comprising the first mode, that each correspond to different instructions indicating amounts of data to report; and
  wherein the sending the information indicating the first mode comprises sending, to the plurality of sensors, information indicating one or more of the plurality of modes.

23. A system comprising:
  a computing device comprising:
    at least one first processor; and
    first memory storing first instructions that, when executed by the at least one first processor, configure the computing device to:
      send, to at least one sensor of a plurality of sensors, information indicating a first mode, of a plurality of modes, indicating one or more first amounts of data, of one or more data types, to report;
      receive, from the plurality of sensors, initial data comprising first data received, from the at least one sensor, according to the first mode;
      determine, based on the initial data, a security event associated with the at least one sensor;
      send, based on the security event and to the at least one sensor, information indicating a second mode indicating one or more second amounts of data, of the one or more data types, to report; and
      receive, from the at least one sensor, second data according to the second mode;
      send one or more instructions, based on the security event and to the at least one sensor, that cause the at least one sensor to:
        determine a difference between past sensor data, reported according to the first mode and within a past time frame, and stored sensor data, received within the past time frame and associated with the second mode; and
        report the difference between the past sensor data reported according to the first mode and the stored sensor data associated with the second mode;
    the at least one sensor comprising:
      at least one second processor; and
      second memory storing second instructions that, when executed by the at least one second processor, configure the at least one sensor to:
        receive the information indicating the first mode.

24. The system of claim 23, wherein the first instructions, when executed by the at least one first processor, further configure the computing device to:
  select the at least one sensor based on a proximity of the at least one sensor to the security event.

25. The system of claim 23, wherein the first instructions, when executed by the at least one first processor, configure the computing device to:
  send the information indicating the second mode based on a first proximity of the at least one sensor to the security event;
  send, to at least one second sensor of the plurality of sensors and based on a second proximity of the at least one second sensor to the security event, information indicating a third mode indicating one or more third amounts of data, of the one or more data types, to report,
  wherein the information indicating the second mode and the information indicating the third mode are configured to cause the at least one sensor to send data at a different rate than the at least one second sensor.

26. The system of claim 23, wherein the first instructions, when executed by the at least one first processor, configure the computing device to send the information indicating the second mode by sending, based on the security event and to different subsets of the plurality of sensors, information indicating different modes, of the plurality of modes, indicating different amounts of data, of the one or more data types, to report, and wherein the sending the information indicating the different modes is based on one or more of:
  a proximity, of sensors in the different subsets, to the security event;
  a time stamp in data received via the sensors in the different subsets; or
  network conditions associated with the sensors in the different subsets.

27. The system of claim 23, wherein the first instructions, when executed by the at least one first processor, further configure the computing device to:
  receive information indicating one or more of:
    one or more amounts of data associated with the one or more data types; or
    one or more associations of the one or more data types with one or more security event types,
  wherein the plurality of modes indicate instructions to report or store data of the one or more data types in amounts based on the received information.

28. The system of claim 23, wherein the first instructions, when executed by the at least one first processor, further configure the computing device to:

receive information indicating the one or more data types associated with the plurality of sensors and one or more amounts of data associated with the one or more data types; and assign, based on a comparison of the one or more amounts of data and one or more network bandwidths associated with the plurality of sensors, the one or more data types to a plurality of reporting modes, comprising the first mode, that each correspond to different instructions indicating amounts of data to report; and wherein the sending the information indicating the first mode comprises sending, to the plurality of sensors, information indicating one or more of the plurality of modes.

* * * * *